US006681262B1

United States Patent
Rimmer

(10) Patent No.: US 6,681,262 B1
(45) Date of Patent: Jan. 20, 2004

(54) NETWORK DATA FLOW OPTIMIZATION

(75) Inventor: Todd Rimmer, Exton, PA (US)

(73) Assignee: Infinicon Systems, King of Prussia, PA (US)

( * ) Notice: Subject to any disclaimer, the term of this patent is extended or adjusted under 35 U.S.C. 154(b) by 35 days.

(21) Appl. No.: 10/186,192

(22) Filed: Jun. 28, 2002

Related U.S. Application Data

(60) Provisional application No. 60/380,071, filed on May 6, 2002.

(51) Int. Cl.[7] ............................................... G06F 15/16
(52) U.S. Cl. ........................ 709/250; 709/234; 709/249
(58) Field of Search ................................ 709/245, 234, 709/249, 250; 370/360, 389

(56) References Cited

U.S. PATENT DOCUMENTS 5,634,068 A  *  5/1997  Nishtala et al. ............. 711/141

* cited by examiner

Primary Examiner—Frantz B. Jean
(74) Attorney, Agent, or Firm—Morgan, Lewis & Bockius LLP

(57) ABSTRACT

A shared I/O subsystem having a plurality of ports, where each of the ports includes a plurality of address bits and first and second masks associated therewith. The shared I/O subsystem receives a data packet from a first of the plurality of ports, selects from one or more tables the plurality of address bits and the first and second masks associated with the first port, applies an AND function to the address bits and the first mask associated with the first port, applies an OR function to the result of applying the AND function and the second mask associated with the first port, and selectively transmits the data packet to one or more of the ports in accordance with a result of applying the OR function.

21 Claims, 17 Drawing Sheets

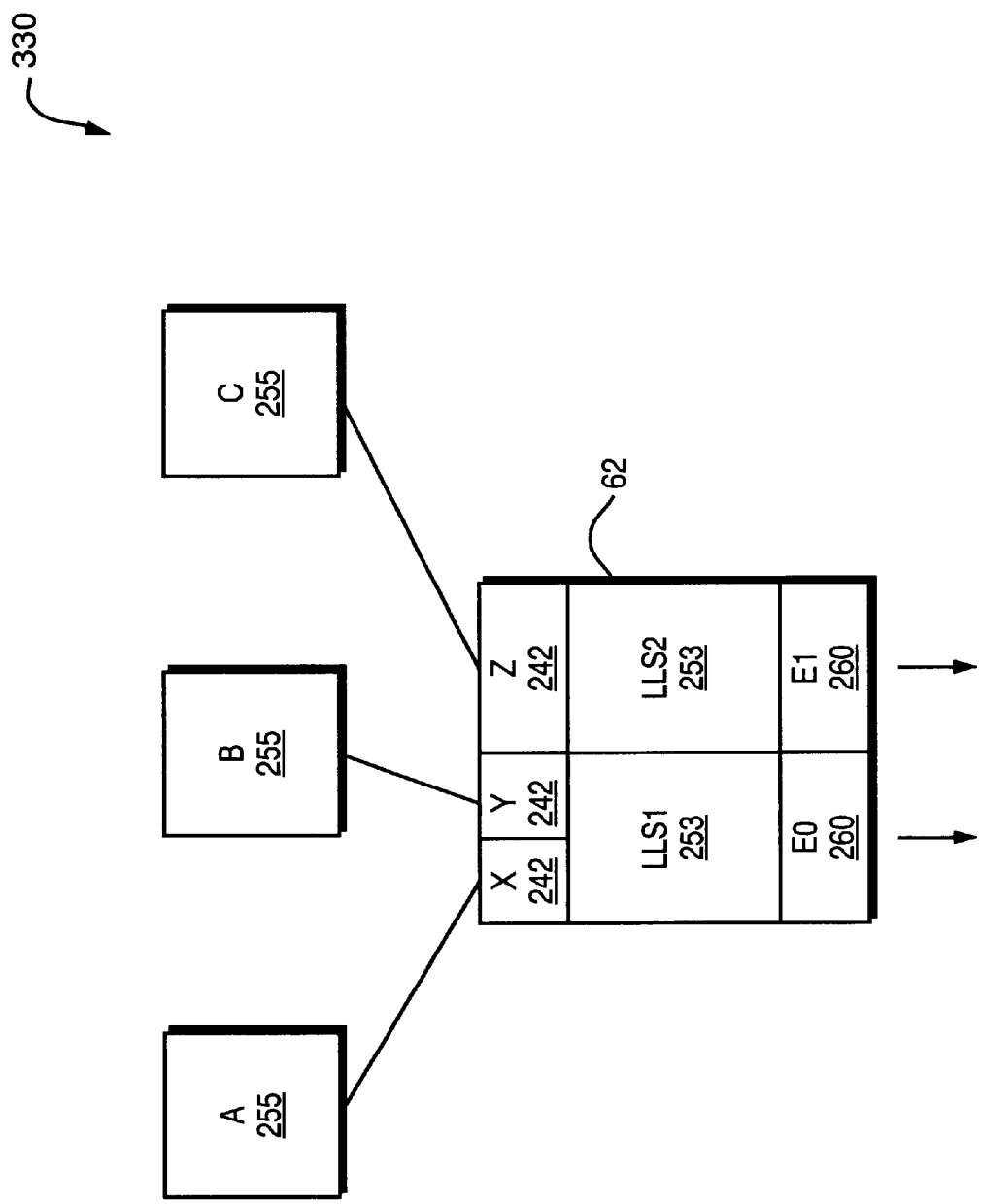

NETWORK DATA FLOW OPTIMIZATION

CROSS REFERENCE TO RELATED APPLICATIONS

This application claims priority to provisional patent application No. 60/380,071, entitled "Shared I/O Subsystem", filed May 6, 2002, incorporated herein by reference.

FIELD OF THE INVENTION

The invention relates generally to computer network systems, and in particular, to shared computer network input/output subsystems.

BACKGROUND OF INVENTION

The Peripheral Component Interconnect (PCI), a local bus standard developed by Intel Corporation, has become the industry standard for providing all primary I/O functions for nearly all classes of computers and other peripheral devices. Some of the computers that employ the PCI architecture, for instance, range from a personal microcomputer (or desktop computer) at a lower entry-level to a server at an upper enterprise-level.

However, while virtually all aspects of the computer technology, such as a processor or memory, advanced dramatically, especially over the past decade, the PCI system architecture has not changed at the same pace. The current PCI system has become considerably outdated when compared to other components of today's technology. This is especially true at the upper enterprise-level. For instance, the current PCI bus system employs a shared-bus concept, which means that all devices connected to the PCI bus system must share a specific amount of bandwidth. As more devices are added to the PCI bus system, the overall bandwidth afforded to each device decreases. Also, as the speed (i.e., MHz) of the PCI bus system is increased, the lesser number of devices can be added to the PCI bus system. In other words, a device connected to a PCI bus system indirectly affects the performance of other devices connected to that PCI bus system.

It should be apparent that the inherent limitation of the PCI system discussed above may not be feasible for meeting the demands of today's enterprises. Many of today's enterprises run distributed applications systems where it would be more appropriate to use an interconnection system that is independently scalable without impacting the existing performance of the current system. E-commerce applications that run in server cluster environments, for example, would benefit tremendously from an interconnection system that is independently scalable from the servers, networks, and other peripherals.

While the current PCI system generally servers the computing needs for many individuals using microcomputers, it does not adequately accommodate the computing needs of today's enterprises. A poor bandwidth, reliability, and scalability, for instance, are just a few exemplary areas where the current PCI system needs to be addressed. There are other areas of concern for the current PCI system. For instance, I/Os on the bus are interrupt driven. This means that the processor is involved in all data transfers. Constant CPU interruptions decrease overall CPU performance, thereby decreasing much of the benefits of increased processor and memory speeds provided by today's technology. For many enterprises that use a traditional network system, these issues become even more significant as the size of the computer network grows in order to meet the growing demands of many user's computing needs.

To combat this situation, a new generation of I/O infrastructure called InfiniBand™ has been introduced. InfiniBand™ addresses the need to provide high-speed connectivity out of the server. It enhances the ability to transfer data better than today's shared bus architectures. InfiniBand™ architecture is a creation of the InfiniBand Trade Association (IBTA). The IBTA has released the specification, "InfiniBand™ Architecture Specification", Volume 2, Release 1.0.a (Jun. 19, 2001), which is incorporated by reference herein.

Even with the advent of new technologies, such as InfiniBand™, however, there are several areas of computing needs that still need to be addressed. One obvious area of computing needs involves an implementation of any new technology over an existing (or incumbent) system. For instance, installing a new infrastructure would necessitate acquiring new equipment to replace the existing equipment. Replacing the existing equipment is not only costly, but also disruptive to current operation of the enterprise.

This issue can be readily observed if one looks to a traditional network system that includes multiple servers where each server has its own dedicated input/output (I/O) subsystem. A typical dedicated I/O subsystem is generally based on the PCI local bus system and must be tightly bound to the processing complex (i.e., central processing unit) of the server. As the popularity of expansive networks (such as Local Area Network (LAN), Wide Area Network (WAN), InterProcess (IPC) Network, and even the Internet) grows, a typical server of a traditional network system needs to have the capacity to accommodate these network implementations without disrupting the current operation. That is, a typical server in today's network environment must have an I/O subsystem that has the capacity to interconnect the server to these expansive network implementations. Note that while there are certain adapters (and/or controllers) that can be used to accommodate some of these new technologies over an existing network system, this arrangement may not be cost efficient.

FIG. 1A illustrates a prior art network configuration of a server having its own dedicated I/O subsystem. To support network interconnections to various networks such as Fibre Channel Storage Area Network (FC SAN) 120, Ethernet 110, or IPC Network 130, the server shown in FIG. 1A uses several adapters and controllers. The PCI local bus 20 of the server 5 connects various network connecting links including Network Interface Cards (or Network Interface Controllers) (NIC) 40 Host Bust Adapters (HBA) 50, and InterProcess Communications (IPC) adapters 30.

It should be apparent that, based on FIG. 1A, a dedicated I/O subsystem of today's traditional server systems is very complex and inefficient. An additional dedicated I/O subsystem using the PCI local bus architecture is required every time a server is added to the existing network configuration. This limited scalability feature of the dedicated I/O subsystem architecture makes it very expensive and complex to expand as required by the growing demands of today's enterprises. Also, adding new technologies over an existing network system via adapters and controllers can be very inefficient due to added density in a server, and cost of implementation.

Accordingly, it is believed that there is a need for providing a shareable, centralized I/O subsystem that accommodates multiple servers in a system. It is believed that there is a further need for providing an independently scalable interconnect system that supports multiple servers and other network implementations. It is believed that there is yet a further need for a system and method for increasing bandwidth and other performance for each server connected to a network system. It is also believed that there is a need for a system and method that provides a shareable, centralized I/O subsystem to an existing network configuration without disrupting the operation of the current infrastructure, and in a manner that complements the incumbent technologies.

SUMMARY OF THE INVENTION

The present invention is directed to a computer system that includes a plurality of servers, and a shared I/O subsystem coupled to each of the servers and to one or more I/O interfaces. The shared I/O subsystem services I/O requests made by two or more of the servers. Each I/O interface may couple to a network, appliance, or other device. The I/O requests serviced by the shared I/O subsystem may alternatively include software initiated or hardware initiated I/O requests. In one embodiment, different servers coupled to the shared I/O subsystem use different operating systems. In addition, in one embodiment, each I/O interface may be used by two or more servers.

In one embodiment, the servers are interconnected to the shared I/O subsystem by a high-speed, high-bandwidth, low-latency switching fabric. The switching fabric includes dedicated circuits, which allow the various servers to communicate with each other. In one embodiment, the switching fabric uses the InfiniBand protocol for communication. The shared I/O subsystem is preferably a scalable infrastructure that is scalable independently from the servers and/or the switching fabric.

In one embodiment, the shared I/O subsystem includes one or more I/O interface units. Each I/O interface unit preferably includes an I/O management unit that performs I/O functions such as a configuration function, a management function and a monitoring function, for the shared I/O subsystem.

The servers that are serviced by the shared I/O subsystem may be clustered to provide parallel processing, InterProcess Communications, load balancing or fault tolerant operation.

The present invention is also directed to a shared I/O subsystem that couples a plurality of computer systems to at least one shared I/O interface. The shared I/O subsystem includes a plurality of virtual I/O interfaces that are communicatively coupled to the computer systems where each of the computer systems includes a virtual adapter that communicates with one of the virtual I/O interfaces. The shared I/O subsystem further includes a forwarding function having a forwarding table that includes a plurality of entries corresponding to each of the virtual I/O interfaces. The forwarding function receives a first I/O packet from one of the virtual I/O interfaces and uses the forwarding table to direct the first I/O packet to at least one of a physical adapter associated with the at least one shared I/O interface and one or more of other ones of the virtual I/O interfaces. The forwarding function also receives a second I/O packet from the physical adapter and uses the forwarding table to direct the second I/O packet to one or more of the virtual I/O interfaces.

The present invention is also directed at a shared I/O subsystem for a plurality of computer systems where a plurality of virtual I/O interfaces are communicatively coupled to the computer systems. Each of the computer systems includes a virtual adapter that communicates with one of the virtual I/O interfaces. The shared I/O subsystem also includes a plurality of I/O interfaces and a forwarding function. The forwarding function includes a plurality of forwarding table entries that logically arrange the shared I/O subsystem into one or more logical switches. Each of the logical switches communicatively couples one or more of the virtual I/O interfaces to one of the I/O interfaces. A logical switch receives a first I/O packet from one of the virtual I/O interfaces and directs the first I/O packet to at least one of the I/O interface and one or more of other ones of the virtual I/O interfaces. A logical switch also receives a second I/O packet from the I/O interface and directs the second I/O packet to one or more of the virtual I/O interfaces.

The present invention is also directed to a shared I/O subsystem having a plurality of ports, where each of the ports includes a plurality of address bits and first and second masks associated therewith. The shared I/O subsystem receives a data packet from a first of the plurality of ports, selects from one or more tables the plurality of address bits and the first and second masks associated with the first port, applies an AND function to the address bits and the first mask associated with the first port, applies an OR function to the result of applying the AND function and the second mask associated with the first port, and selectively transmits the data packet to one or more of the ports in accordance with a result of applying the OR function.

The present invention is also directed to a shared I/O subsystem having a forwarding table and a plurality of I/O interfaces. The forwarding table has a plurality of entries that correspond to each of the I/O interfaces. The shared I/O subsystem receives a data packet from one of the I/O interfaces where the data packet includes a plurality of address bits, applies the address bits of the data-packet to the forwarding table, and discards the data packet if applying the address bits of the data packet to the forwarding table fails to result in identification of a valid destination.

The present invention is also directed to a shared I/O subsystem for a plurality of computer systems. The shared I/O subsystem includes a plurality of physical I/O interfaces and a plurality of virtual I/O interfaces where each of the computer systems is communicatively coupled to one or more of the virtual I/O interfaces. The shared I/O subsystem also includes a forwarding function having a forwarding table that logically arranges the shared I/O subsystem into one or more logical LAN switches. Each of the logical LAN switches communicatively couples one or more of the virtual I/O interfaces to at least one of the physical I/O interfaces. For each of the logical LAN switches, the forwarding function receives a data packet from any one from the group of the physical I/O interfaces and the virtual I/O interfaces, and directs the data packet to at least one from the group of the physical I/O interfaces and the virtual I/O interfaces. Two or more of the physical I/O interfaces may be aggregated to form a logical I/O interface by selectively altering entries in the forwarding table without reconfiguring the computer systems.

The present invention is also directed at a shared I/O subsystem for a plurality of computer systems. The shared I/O subsystem includes a plurality of ports that communicatively couple the computer systems to the shared I/O subsystem where each of the ports includes at least one corresponding bit in an adjustable span port register. Data packets arriving on the plurality of ports may be selectively provided to a span port based on a current state of the adjustable span port register.

The present invention is also directed to a shared I/O subsystem for providing network protocol management for a plurality of computer systems. The shared I/O subsystem includes a plurality of I/O interfaces where each of the I/O interfaces operatively couples one of the computer systems to the shared I/O subsystem. The shared I/O subsystem also includes an I/O management link that operatively interconnects the I/O interfaces, and a link layer switch that communicatively couples to each of the I/O interfaces. The link layer switch receives a data packet from one of the I/O interfaces and directs the data packet to one or more of the other ones of the I/O interfaces. The I/O interfaces may form a local area network within the shared I/O subsystem.

The present invention is also directed to a shared I/O subsystem that includes a plurality of I/O interfaces for coupling a plurality of computer systems where each of I/O interfaces communicatively couples one of the computer systems to the shared I/O subsystem. The shared I/O subsystem receives, at a first one of the I/O interfaces, a data packet from one of the computer systems coupled to the first one of the I/O interfaces where the data packet has a variable length, arranges, at the first one of the I/O interfaces, the data packet into an internal format where the internal format has a first portion that includes data bits and a second portion that includes control bits, receives the data packet in a buffer in the shared I/O subsystem where the second portion is received after the first portion, verifies, with the shared I/O subsystem, that the data packet has been completely received by the buffer by monitoring a memory bit aligned with a final bit in the second portion of the data packet, and transmits, in response to the verifying, the data packet to another one of the computer systems coupled to a second one of the I/O interfaces.

The present invention is also directed to a method and apparatus for subdividing a port of a 12× connector that complies with the mechanical dimensions set forth in Infini-Band™ Architecture Specification, Volume 2, Release 1.0.a. The connector connects to a module. At the module, signals received from the connector are subdivided into two or more ports that comply with the InfiniBand™ Architecture Specification, Volume 2, Release 1.0.a.

BRIEF DESCRIPTION OF THE DRAWINGS

FIG. 8A is a logical diagram of one embodiment of I/O interface unit configuration, in accordance with the present invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts and steps.

Figure 1A:
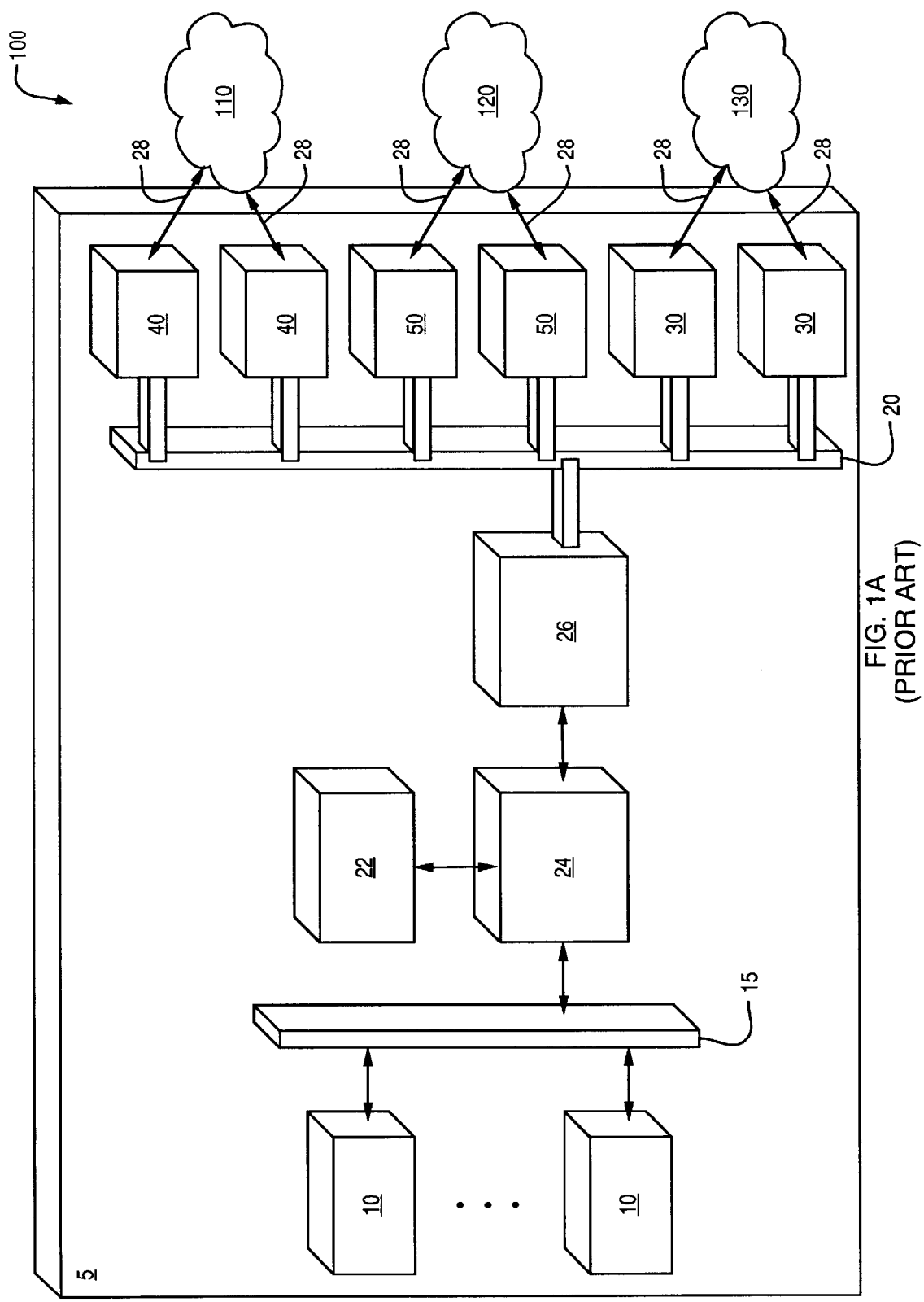
FIG. 1A is a prior art configuration of a server and its dedicated I/O subsystem.

As shown in FIG. 1A, in a traditional (prior art) network system 100, a server 5 generally contains many components. These components, however, can logically be grouped into a few simple categories. As shown in the diagram, server 5 contains one or more CPUs 10, main memory 22, memory bridge 24, and I/O bridge 26. Server 5 communicates to networks such as Ethernet 110, Fibre Channel SAN 120, and IPC Network 130 through NICs 40, Fibre Channel Host Bus Adapters (HBAs) 50, and IPC adapters 30, respectively. These adapters or network cards (i.e., NICs 40, HBAs 50, or IPC adapters 30) are installed in server 5 and provide connectivity from the host CPUs 10 to networks 110, 120, 130.

As shown, adapters/cards 30, 40, 50 sit between server 5's system bus 15 and network links 28, and manage the transfer of information between the two. I/O bridge 26 connects network adapters/cards 30, 40, 50 to local PCI bus 20. Note that a collection of network adapters/cards 30, 40, and local PCI bus 20 forms the dedicated I/O subsystem of server 5. It should be apparent that a dedicated I/O subsystem of a traditional server is very complex, which translates into limited scalability and performance. As noted earlier, for many enterprises, the limited scalability and bandwidth of the dedicated I/O subsystem of a server make it very expensive and complex to expand as needed.

Figure 1B:
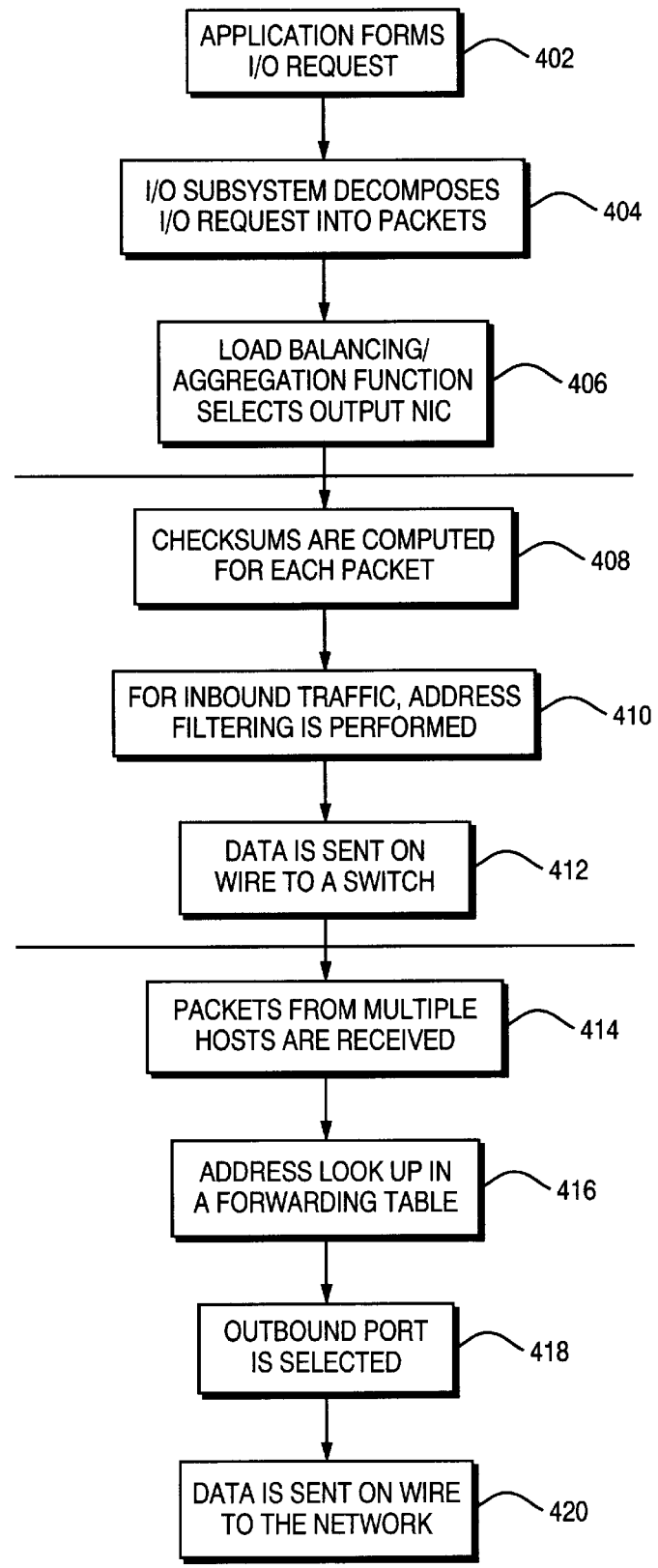
FIG. 1B shows a flowchart that illustrates a prior art method of processing I/O requests for a server in a traditional network system.

FIG. 1B shows a flowchart that illustrates a prior art method of processing I/O requests for a server that has its own dedicated I/O subsystem in a traditional network system. As noted, a typical I/O subsystem in a traditional network generally includes the PCI bus system. The flowchart of FIG. 1B shows typical activities taking place at a server or host level, an output port level, and a switch level.

Steps 402, 404, and 406 are performed at a server or host level. As shown, in step 402, an application forms an I/O request. The dedicated I/O subsystem then decomposes the I/O request into packets, in step 404. In step 406, a load balancing and/or aggregation function is performed, at which point an output port is selected. The purpose of the load balancing and/or aggregation function is to process and communicate data transfer activities evenly across a computer network so that no single device is overwhelmed. Load balancing is important for networks where it is difficult to predict the number of requests that will be issued by a server.

Steps 408, 410, and 412 and performed at an output port (e.g., NIC) level. As shown, in step 408, for each data packet, checksums are computed. In step 410, address filtering is performed for inbound traffic. Address filtering is done by analyzing the outgoing packets and letting them pass or halting them based on the addresses of the source and destination. In step 412, the packets are sent to a switch.

Steps 414, 416, 418, and 420 are performed at a switch level. As shown, in step 414, multiple packets from multiple hosts are received by a switch. For all packets received, appropriate addresses are referenced in a forwarding table in step 416, and an outbound port is selected in step 418. In step 420, the packets are sent to a network. It should be noted that the prior art method of using multiple dedicated I/O subsystems, as illustrated in FIG. 1B, presents several drawbacks, including but not limited to poor scalability, efficiency, performance, and reliability, all of which represent important computing needs to today's enterprises.

Figure 1C:
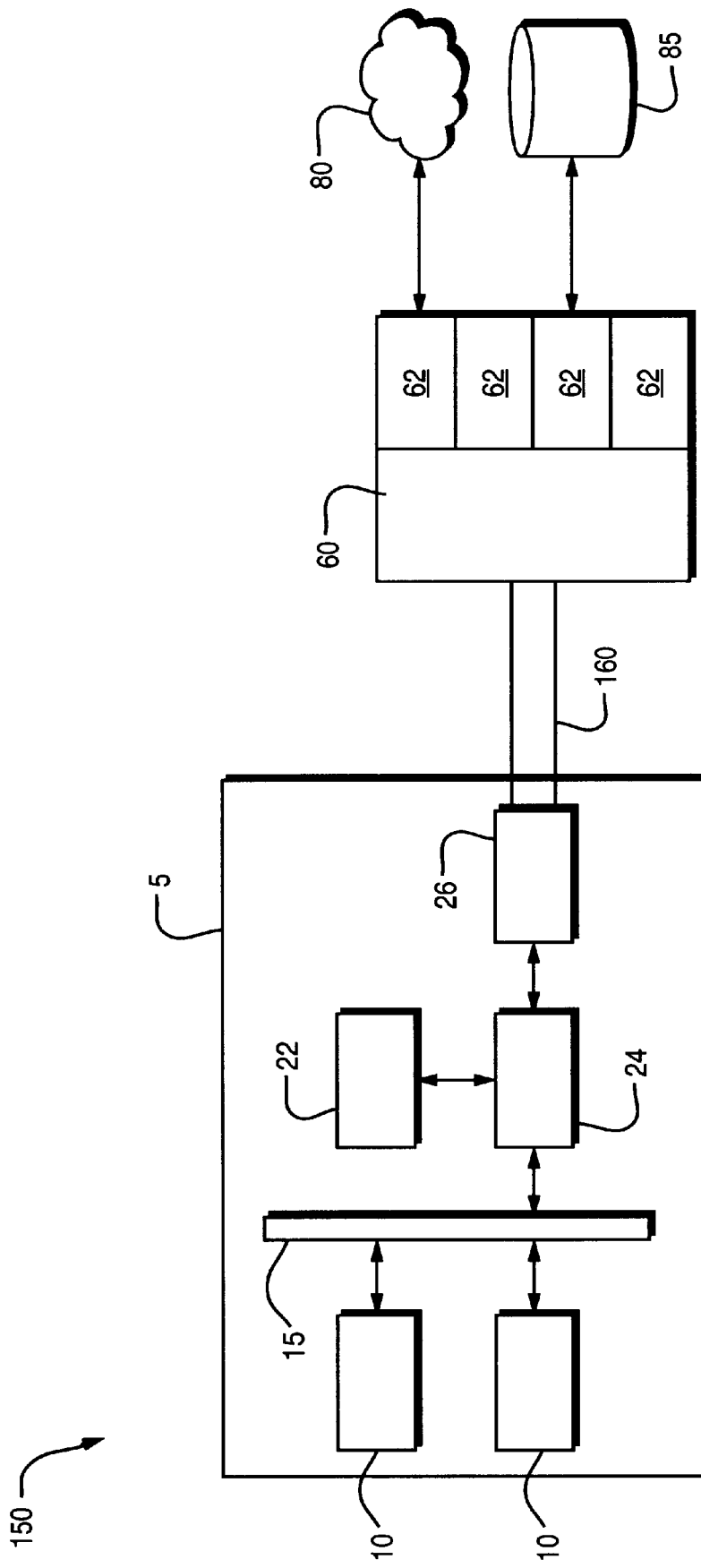
FIG. 1C illustrates the server of FIG. 1A, having a new I/O interconnect architecture, in accordance with the present invention.

In order to meet the growing demands of today's enterprises, a number of new interconnect architecture systems that can replace the current PCI bus system have been introduced. Among the most notable interconnect systems, as noted above, is the InfiniBand™ system. InfiniBand™ is a new architecture of interconnect systems that offers a superior scalability and performance compared to the current PCI bus system. FIG. 1C illustrates a network configuration 150 including the server of FIG. 1A, having its dedicated I/O subsystem replaced by shared I/O subsystem 60 using InfiniBand fabric 160. As shown, shared I/O subsystem 60 replaces the dedicated I/O subsystem of server 5, thereby eliminating the need to install network adapters/cards 30, 40, 50 and local PCI bus 20. Also, using shared I/O subsystem 60, a server 5 can connect directly to existing network sources such as network storage 85 or even the Internet 80 via respective I/O interface units 62. Note that shared I/O subsystem 60 shown in FIG. 1C is operatively coupled to server 5 via InfiniBand fabric 160. Network configuration 150 shown in FIG. 1B offers improved scalability and performance than the configuration 100 shown in FIG. 1A. As described further and more in detail below, in accordance with one aspect of the present invention, I/O interface unit 62 comprises one or more I/O interfaces 61 (not shown), each of which can be used to couple a network link or even a server. Thus, one or more I/O interfaces 61 form an I/O interface unit 62. For brevity and clarity purposes, I/O interface 61 (shown in FIG. 2B) is not shown in FIG. 1C.

Figure 2A:
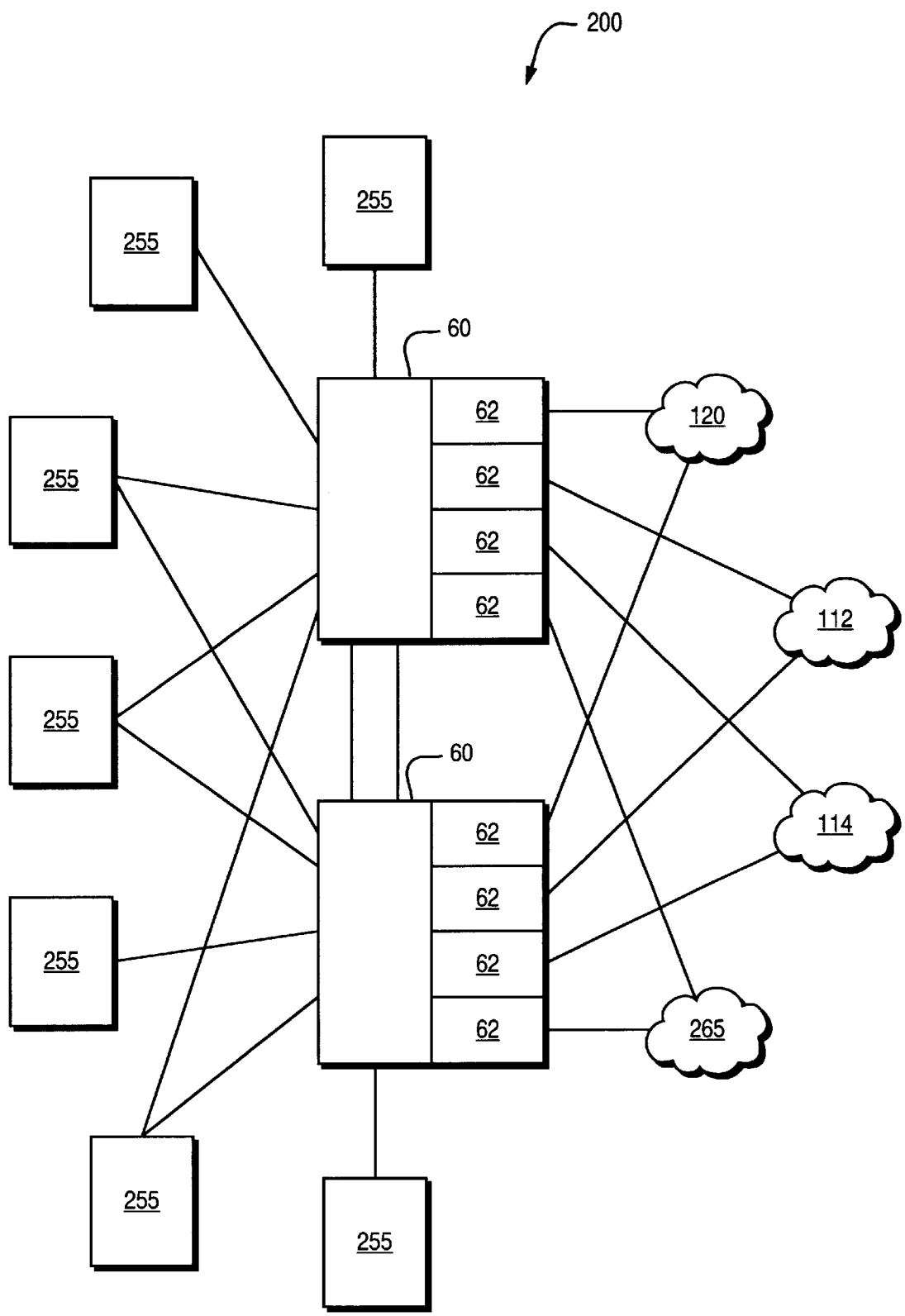
FIG. 2A is a block diagram of one embodiment of the present invention showing a computer network system including multiple servers and existing network connections coupled to shared I/O subsystems.

In accordance with one aspect of the present invention, FIG. 2A shows network system 200 using shared I/O subsystem 60 of the present invention. As shown, multiple servers 255 are coupled to two centralized, shared I/O subsystems 60, each of which includes a plurality of I/O interface units 62. Using I/O interface units 62, each server 255 coupled to shared I/O subsystems 60 can access all expansive networks. Note that servers 255 do not have their own dedicated I/O subsystems; rather they all share the centralized I/O subsystems 60. By removing the dedicated I/O subsystem from the servers 255, each server 255 can have more density, allowing for a more flexible infrastructure. Further note that while some servers 255 are coupled to only one shared I/O subsystem 60, the other servers 255 are coupled to both shared I/O subsystems 60. Two shared I/O subsystems 60 are operatively coupled to one another.

In one aspect of the present invention, each I/O interface unit 62 of shared I/O subsystems 60 can be configured to provide a connection to different types of network configurations such as FC SAN 120, Ethernet SAN 112, Ethernet LAN/WAN 114, or even InfiniBand Storage Network 265. It should be noted that while network system 200 described above includes two shared I/O subsystems 60, other network configurations are possible using one or more shared I/O subsystems 60.

Figure 2B:
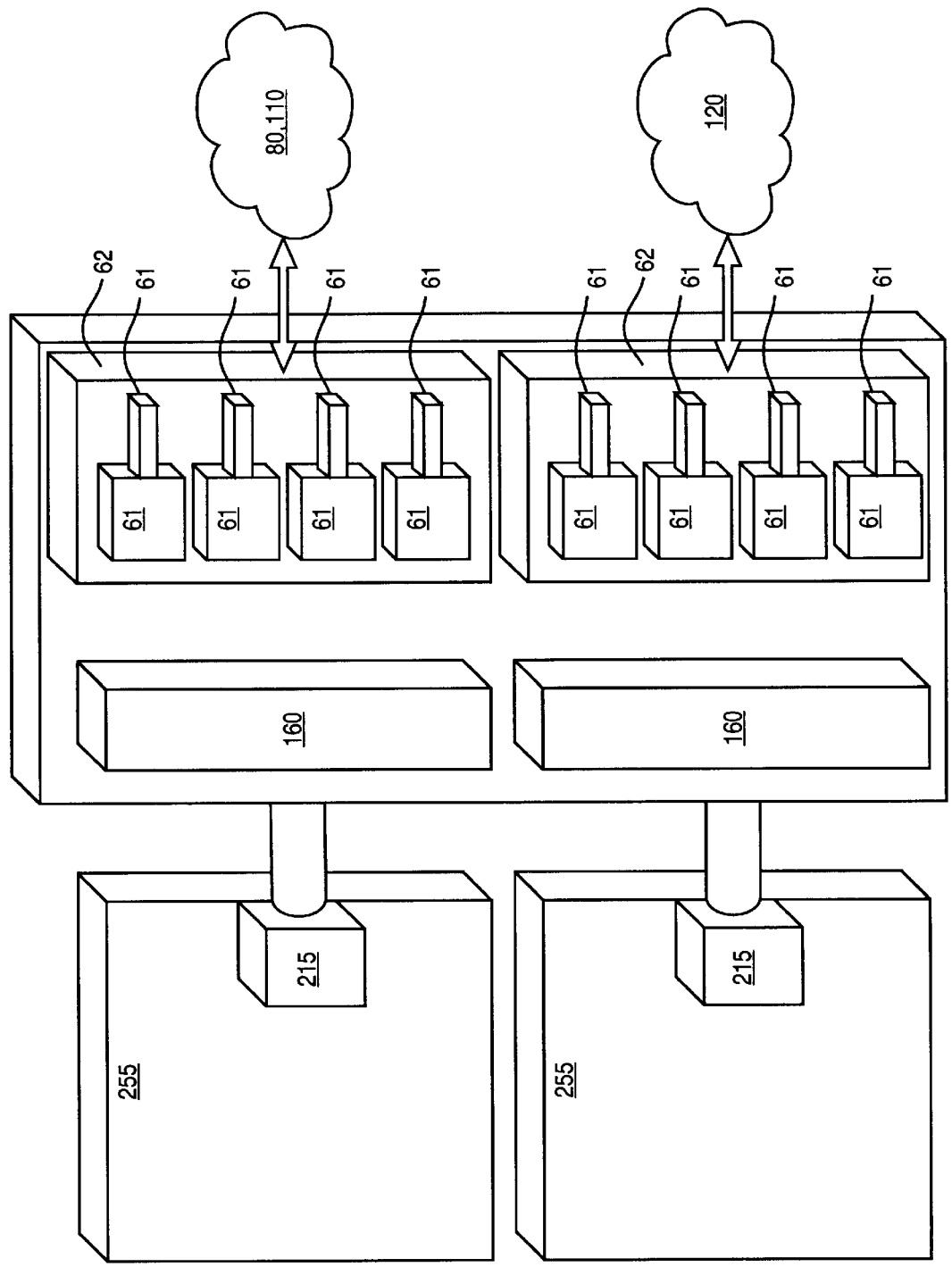
FIG. 2B is a block diagram of one embodiment of the shared I/O subsystem having multiple I/O interface units, in accordance with the present invention.

FIG. 2B shows a block diagram of one embodiment of shared I/O subsystem 60 coupled to servers 255. Note that for brevity and clarity purposes, certain components of shared I/O subsystem, such as switching unit 235 or I/O management unit 230 are not shown. These components are shown and described below.

As shown, using a low latency, high bandwidth fabric such as InfiniBand fabric 160, multiple servers 255 share I/O subsystem 60, which obviates the need for having a plurality of dedicated I/O subsystems. Rather than having a dedicated I/O subsystem, server 255 has an adapter such as Host Channel Adapter (HCA) 215 that interfaces between server 255 and shared I/O subsystem 60. Note that for brevity and clarity purposes, certain components of servers 255, such as CPU 10 or memory 22 are not shown in FIG. 2B. HCA 215 acts as a common controller used in a traditional server system. In one aspect of the present invention, HCA 215 has a specialized chip that processes the InfiniBand link protocol at wire speed and without incurring any host overhead. HCA 215 performs all the functions required to send/receive complete I/O requests. HCA 215 communicates to shared I/O subsystem 60 by sending I/O requests through a fabric, such as InfiniBand fabric 160.

Furthermore, unlike a traditional network system running on the PCI bus system, shared I/O subsystem 60 increases server 255's connectivity to networks such as Ethernet/Internet 80/110 or FC SAN 120, by allowing increased bandwidth and improved link utilization. In other words, shared I/O subsystem 60 allows the bandwidth provided by the shared links to migrate to servers 255 with the highest demand, providing those servers 255 with significantly higher instantaneous bandwidth than would be feasible with dedicated I/O subsystems, while simultaneously improving link utilization. As noted earlier, in accordance with one aspect of the present invention, each I/O interface unit 62 comprises one or more I/O interfaces 61.

FIG. 2B shows shared I/O subsystem 60 having two I/O interface units 62, each of which includes multiple I/O interfaces 61. Note that one I/O interface 61 shown in FIG. 2B is operatively coupled to Ethernet/Internet 80/110 while another I/O interface 61 is operatively coupled to FC SAN 120. It should be noted that while I/O interfaces 61 shown in FIG. 2B are formed in I/O interface units 62, in accordance with another aspect of the present invention, I/O interfaces 61 can be used to couple servers 255 to networks such as Ethernet/Internet 80/110 or FC SAN 120 without using I/O interface units 62.

In one embodiment of the present invention, each server 255 coupled to shared I/O subsystem 60 may run on an operating system that is different from an operating system of another server 255.

Figure 2C:
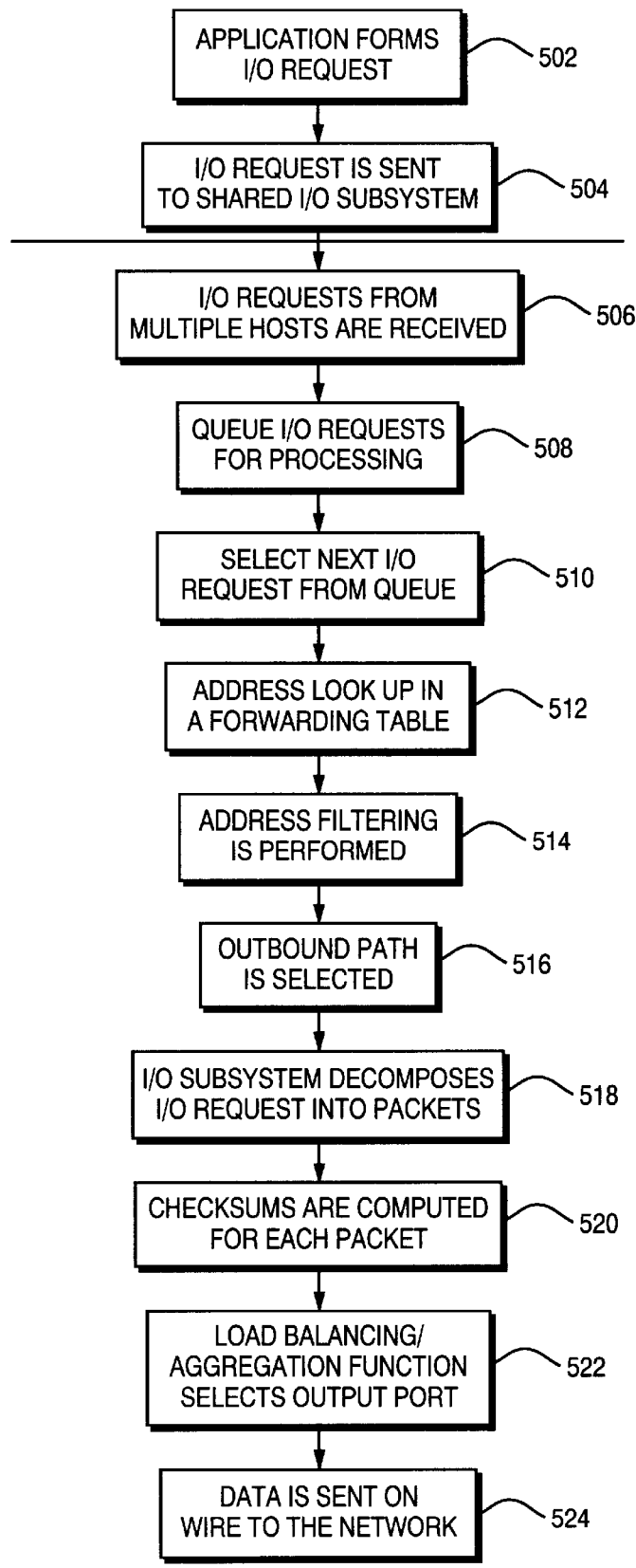
FIG. 2C is a flowchart illustrating a method of processing I/O requests using the shared I/O subsystem.

In accordance with one aspect of the present invention, FIG. 2C shows a flowchart illustrating a method of processing I/O requests of multiple servers using the shared I/O subsystem. As described in detail below, a shared I/O subsystem 60 typically comprises a high-speed, high-bandwidth, low-latency switching fabric, such as the Infini-Band fabric. Using such a fabric, shared I/O subsystem 60 effectively processes different I/O requests made by multiple servers 255 in a network system. Furthermore, as noted earlier in FIG. 1B, in a prior art method of processing I/O requests for a server that has its own dedicated I/O subsystem in a traditional network system, typical activities relating to processing I/O requests take place at least three different levels: a server or host level, an output port level, and a switch level. The embodiment of the present invention, as illustrated in the flowchart of FIG. 2C, aggregates these typical activities that used to take place at three different levels to one level, namely, a shared I/O subsystem level.

As illustrated, in FIG. 2C, only steps 502 and 504 take place at a server or host level. All other steps take place at the shared 110 subsystem level. In step 502, applications from one or more hosts (e.g., server) form 110 requests. Typical I/O requests may include any programs or operations that are being transferred to the dedicated I/O subsystem. In step 504, multiple 110 requests from multiple hosts are sent to shared I/O subsystem 60.

In step 506, shared 110 subsystem 60 receives the I/O requests sent from multiple hosts. The 110 requests are then queued for processing in step 508. Shared 110 subsystem selects each I/O request from the queue for processing in step 510. For a selected 110 request, an appropriate address is referenced from a forwarding table in step 512. In steps 514 and 516, address filtering is performed and an outbound path is selected for the selected 110 request, respectively.

Shared 110 subsystem then decomposes the 110 request into packets in step 518. In step 520, checksums are computed for the packet. In step 522, a load balancing and/or aggregation function is performed, at which point an output port is selected. Thereafter, the packet is sent to a network in step 524. The steps of FIG. 2C outlined herein are described further below.

Note that, using the inventive method described in FIG. 2C, a shared I/O subsystem 60 of the present invention dramatically increases efficiency and scalability by removing all dedicated 110 subsystems from all servers in a network system. For instance, in FIG. 3, a prior art embodiment illustrating an exemplary network configuration that includes sixteen servers 5 is shown. Under this network configuration, multiple switching units are required to connect all servers 5, thereby creating a giant web. As shown, each server 5 has its own dedicated I/O subsystem. In order to access all available resources such as Ethernet routers 314, Fibre Channel Disk Storage 312, and Tape 310, each server 5 must individually connect to maintenance LAN switch 302, Ethernet GB switch 304, and fiber switch 306. For instance, there are two network connections from HBAs 50 (shown in FIG. 1A) of each server 5 to each fibre switch 306. There are six connections from fibre switches 306 to Fibre Channel Disk Storage 312, and two connections from fibre switches 306 to Tape 310. There are two Ethernet connections from each server 5 to Ethernet GB switches 304. Each server 5 has a connection to maintenance LAN switch 302. As a result of this configuration (i.e., each server 5 connecting individually to all available resources), a total of 212 network connections are used.

Figure 3:
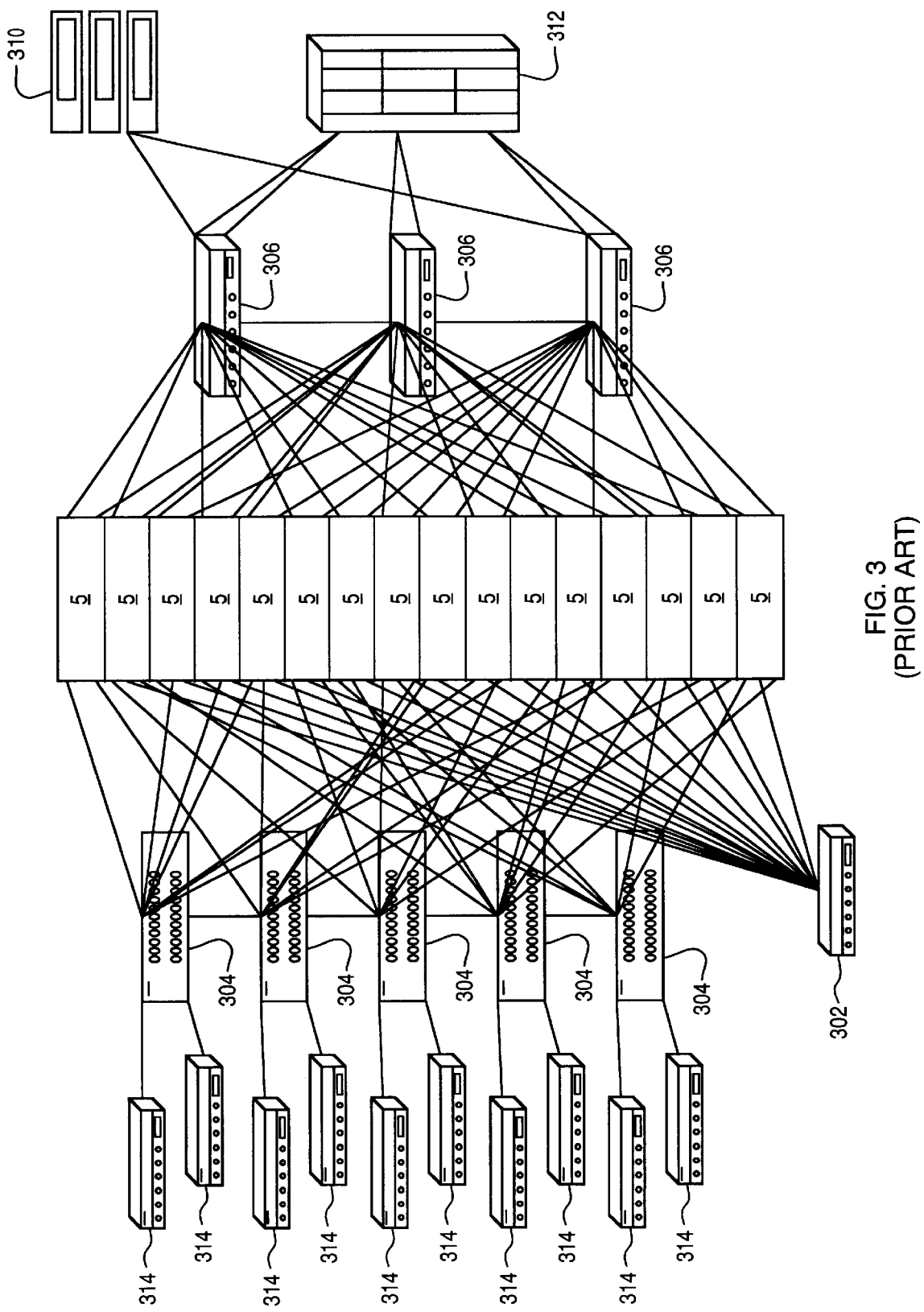
FIG. 3 is a diagram showing a prior art network configuration with multiple dedicated I/O subsystems.
Figure 4:
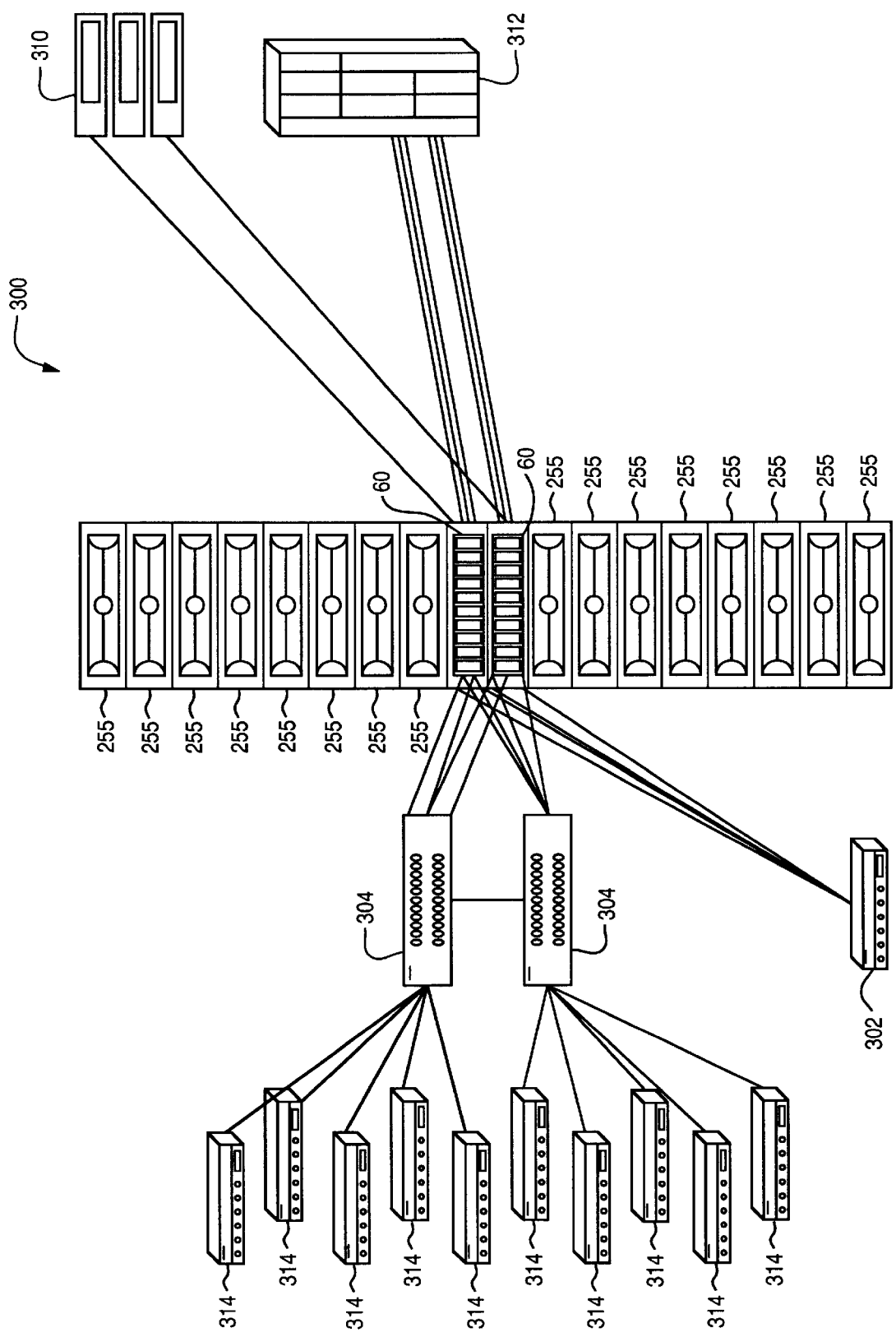
FIG. 4 is a diagram showing a network configuration using a common, shared I/O subsystem in accordance with the present invention.

In FIG. 4, in accordance one aspect of the present invention, network system 300 using shared I/O subsystem 60 is shown. As shown, network system 300 includes a total of sixteen servers 255, all connected to two shared I/O subsystems 60. That is, rather than having sixteen dedicated I/O subsystems as shown in FIG. 3, network system 300 includes only two I/O subsystems 60.

Using shared I/O subsystems 60, each server 255 communicates directly to network devices such as Fibre Channel Disk Storage 312 and Tape 310 without the aid of fiber switches 306. Also, the number of Ethernet GB switches 304 can be reduced since there are less I/O subsystems. The number of connections between maintenance LAN switch 302 and servers 255 is also reduced due to the reduction of I/O subsystems present in the configuration. For instance, there are two connections from each server 255 to shared I/O subsystems 60. There are six connections from shared I/O subsystems 60 to Fibre Channel Disk Storage 312, and two connections from shared I/O subsystems 60 to Tape 310. Also, there are two connections from each shared I/O subsystem 60 to each Ethernet GB switch 304 and to maintenance LAN switch 302. As a result of this configuration, there are only 132 network connections, which represents about 38% reduction from the prior art network configuration shown in FIG. 3. Furthermore, by using a switching fabric such as InfiniBand fabric 160 to interconnect servers 255 in network system 300, each server 255 can benefit from increased bandwidth and connectivity.

Figure 5A:
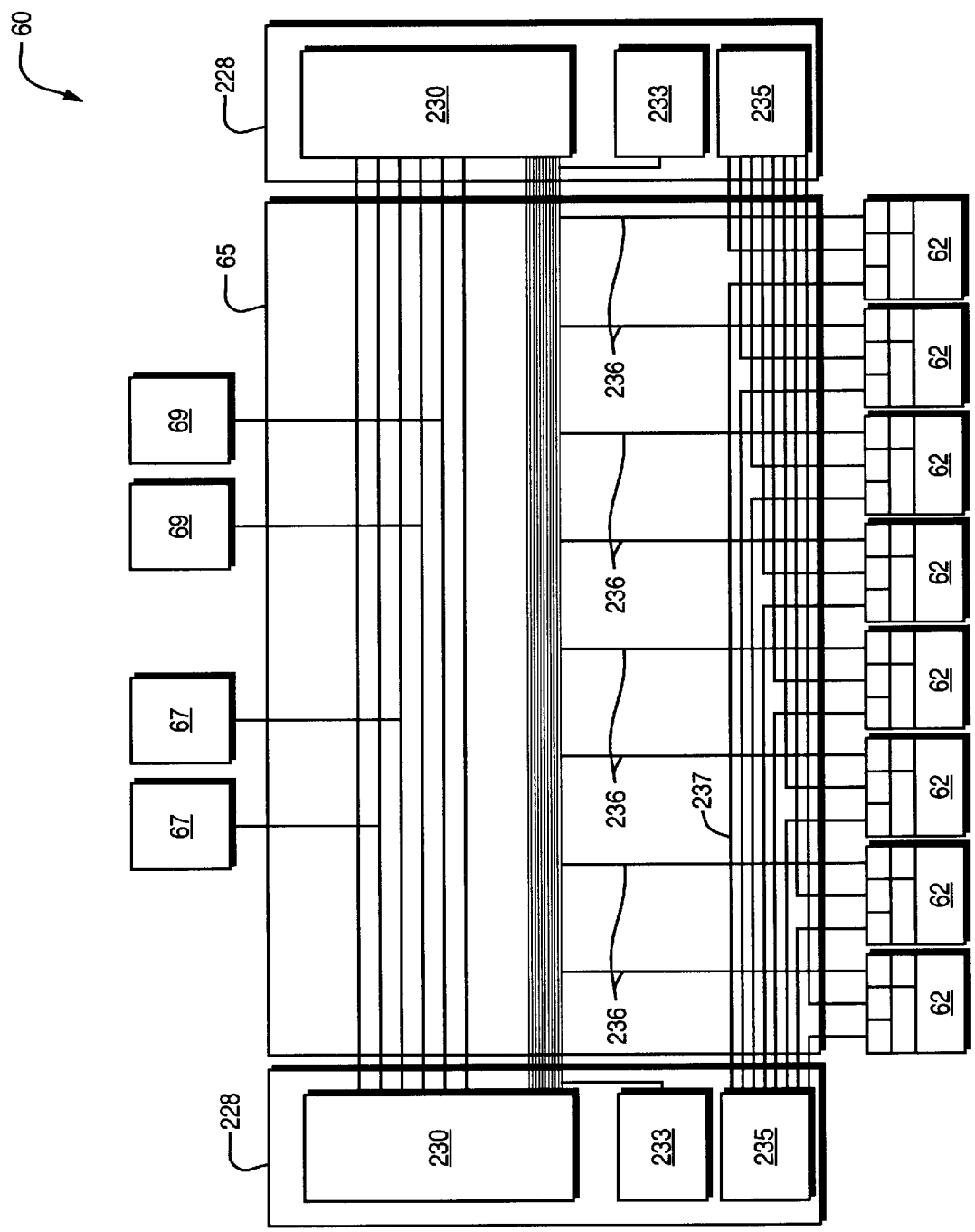
FIG. 5A illustrates a logical representation of one embodiment of the shared I/O subsystem having a backplane including I/O management units and I/O interface units in accordance with the present invention.

In FIG. 5A, in accordance with one aspect of the present invention, a logical representation of shared I/O subsystem 60 having a backplane 65 that includes switch card 228 and I/O interface units 62 is shown. As shown, the components of shared I/O subsystem 60 are formed on backplane 65. It should be noted, however, the components of shared I/O subsystem 60 can be arranged without using a backplane 65. Other ways of arranging the components of I/O subsystem 60 will be known to those skilled in the art and are within the scope of the present invention.

Switch card 228, which includes I/O management unit 230, module management unit 233, and switching unit 235, processes all I/O management functions for shared I/O subsystem 60. Each I/O interface unit 62 is operatively connected to I/O management units 230 using I/O management link 236. As noted earlier and described further below, I/O management link 236, along with switching unit link 237, provides communication connectivity including data transmissions between I/O interface units 62 and switch card 228. Each I/O management unit 230 communicates with all I/O interface units 62, providing and monitoring data flow and power controls to each I/O interface unit 62. Some of the I/O functions provided by I/O management units 230 include a configuration function, a management function, and a monitoring function. As shown, there are two I/O management units 230 in backplane 65. Under this dual I/O management units configuration, the first unit is always active, providing all I/O functions to all I/O interface units 62. The second management unit is passive and will control the 110 functions in the event of a failure in the first management unit.

One or more switching units 235 are located inside shared I/O subsystem 60. As shown, switching units 235 are operatively connected to I/O interface units 62 using switching unit link 237. Each switching unit 235 has a plurality of ports for connecting to servers 255 (not shown). For brevity and clarity purposes, the ports are not shown. Switching units 235 receive and filter I/O requests, such as packets of data, from servers 255 and identify the proper I/O interface units 62 connected to various networks on which to send the I/O requests. Note that, in accordance with one aspect of the present invention, module management unit 233 facilitates communication between I/O management unit 230 and switching units 235. That is, by using module management unit 233, I/O management unit 230 accesses switching units 235.

As noted earlier, each I/O interface unit 62 can be configured to provide a connection to different types of network configurations such as FC SAN 120, Ethernet SAN 112, Ethernet LAN/WAN 114, or even InfiniBand Storage Network 265. I/O interface unit 62 can also be configured to provide a connection to one or more servers 255. In essence, in accordance with one aspect of the present invention, I/O interface unit 62 acts as a line card (or an adapter). I/O interface unit 62 can be, therefore, operatively connected to any computer system such as a server or a network. As described further below, using 110 interface units 62, shared I/O subsystem 60 can be used to create a local area network within the backplane 65. That is, I/O interface units 62 are used as line cards to provide a connection to multiple computer systems. I/O interface unit 62 may also be connected to an existing network system, such as an Ethernet or other types of network system. Thus, in accordance with one aspect of the present invention, I/O interface unit 62 can include a Target Channel Adapter (TCA) 217 (not shown) for coupling network links. It is important to note that I/O interface unit 62 can be configured to include other cards or switches for coupling to a network, appliance or device. Each I/O interface unit 62 has dual connections to backplane 65 for providing redundant operation. As described further below, in accordance with one aspect of the present invention, each I/O interface unit 62 includes switching function 250 and forwarding table 245 (both of which are not shown in FIG. 5A for brevity and clarity purposes).

In one embodiment of the present invention, I/O interface unit 62 includes a module that connects to InfiniBand™ connectors that comport to the mechanical dimensions set forth in InfiniBand™ Architecture Specification, Volume 2, Release 1.0.a. The standard InfiniBand™ connectors are provided in 1x, 4x and 12x links. Making a choice among InfiniBand™ connectors should be based on one's computing needs. That is, since 12x connector provides 12 times more connectivity than 1x connector, for example, 12x connector should be chosen over 1x if such capacity is required. In many situations, however, 12x connector is not utilized to its full capacity. Albeit having 12 "lanes" at its disposal, 12x connector is frequently utilized to less than 50% of its capacity. Furthermore, each of these connectors provides only one port connection. In other words, if more connection is desired, it is necessary to add more InfiniBand™ connectors even if the existing InfiniBand™ connector is being under-utilized.

Figure 5B:
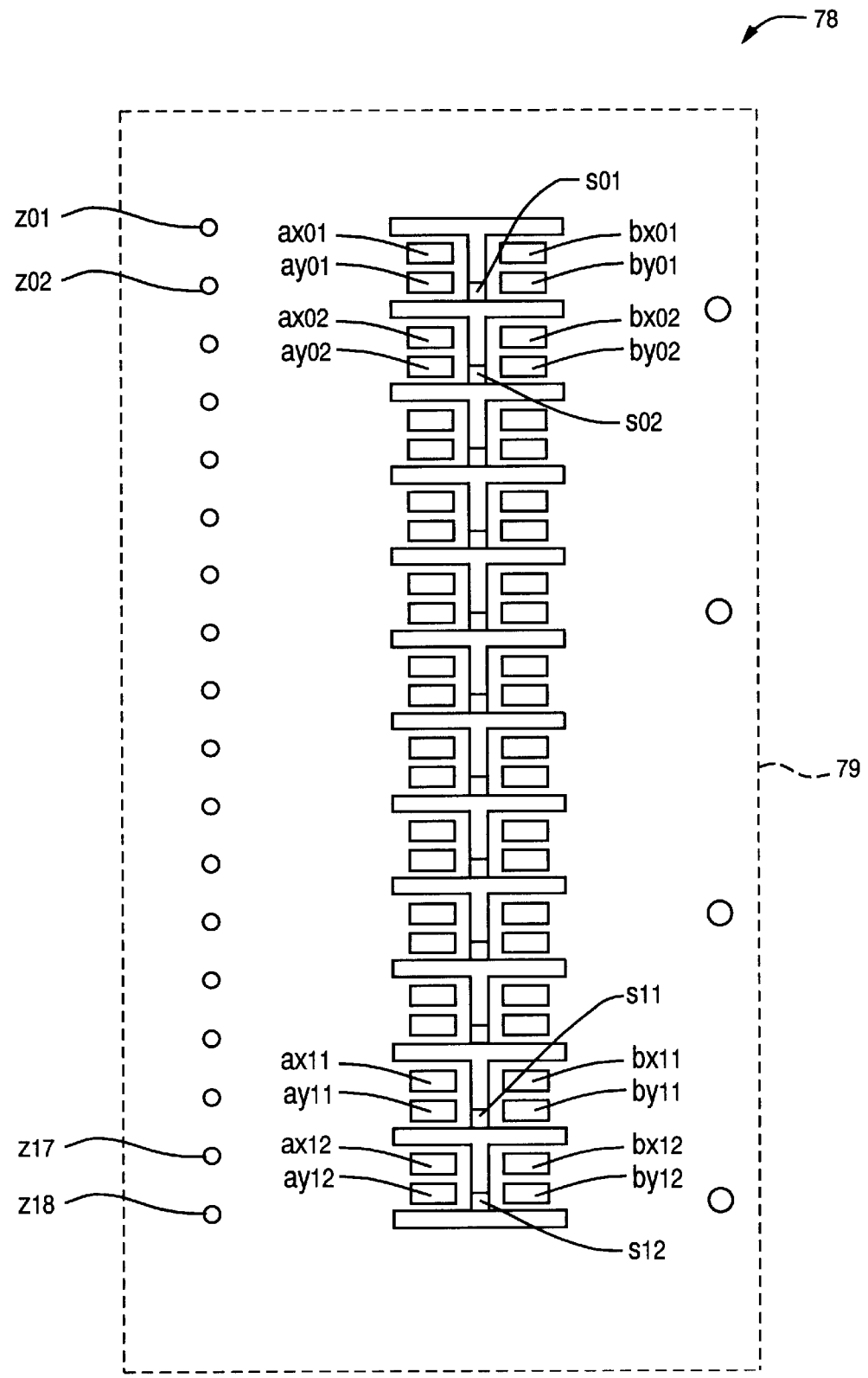
FIG. 5B is a block diagram showing a module, in accordance with the present invention.

Accordingly, in accordance with one aspect of the present invention, a module, which can be used to utilize the InfiniBand™ connector to its fully capacity, is provided. FIG. 5B shows one embodiment of module 78 that can be used to utilize InfiniBand™ 12x port connector to its full capacity. See FIG. 102, InfiniBand™ Architecture Specification, Volume 2, Release 1.0.a, Chapter 10.4.1,1, p. 292 (showing Backplane signal contact assignment of InfiniBand™ 12x port connector). More specifically, FIG. 5B shows physical contact arrangement of module slot 79 for high speed signals. As shown, module 78 is used to subdivide an InfiniBand™ connector to provide two or more ports, thereby creating more connectivity from the connector. For instance, module 78 subdivides 12x InfiniBand™ connector into three ports, of which two are actively used and the remaining one is not used. That is, module 78 provides two 4x InfiniBand™ links to each plug-in module slot 79. The first link connects through byte lanes 0–3 of the InfiniBand™ connector to port 1 on each plug-in module. The second link connects through byte lanes 8–11 of the InfiniBand™ connector to port 2 on each plug-in module. Byte lanes 4–7 are unused. Table 1 below illustrates contact assignments in module slot 79 for high speed signals, in accordance with the present invention.

TABLE 1

| Interface | Row a | | Row b | |
|---|---|---|---|---|
| | Contact | Signal Name | Contact | Signal Name |
| Port 1 | ax01 | IbbxIn (0) | bx01 | IBbxOn (0) |
| | ay01 | IbbxIp (0) | by01 | IBbxOp (0) |
| | ax02 | IbbxIn (1) | bx02 | IBbxOn (1) |
| | ay02 | IbbxIp (1) | by02 | IBbxOp (1) |
| | ax03 | IbbxIn (2) | bx03 | IBbxOn (2) |
| | ay03 | IbbxIp (2) | by03 | IBbxOp (2) |
| | ax04 | IbbxIn (3) | bx04 | IBbxOn (3) |
| | ay04 | IbbxIp (3) | by04 | IBbxOp (3) |
| Unused | ax05 | IbbxIn (4) | bx05 | IBbxOn (4) |
| | ay05 | IbbxIp (4) | by05 | IBbxOp (4) |
| | ax06 | IbbxIn (5) | bx06 | IBbxOn (5) |
| | ay06 | IbbxIp (5) | by06 | IBbxOp (5) |
| | ax07 | IbbxIn (6) | bx07 | IBbxOn (6) |
| | ay07 | IbbxIp (6) | by07 | IBbxOp (6) |
| | ax08 | IbbxIn (7) | bx08 | IBbxOn (7) |
| | ay08 | IbbxIp (7) | by08 | IBbxOp (7) |
| Port 2 | ax09 | IbbxIn (8) | bx09 | IBbxOn (8) |
| | ay09 | IbbxIp (8) | by09 | IBbxOp (8) |
| | ax10 | IbbxIn (9) | bx10 | IBbxOn (9) |
| | ay10 | IbbxIp (9) | by10 | IBbxOp (9) |
| | ax11 | IbbxIn (10) | bx11 | IBbxOn (10) |
| | ay11 | IbbxIp (10) | by11 | IBbxOp (10) |
| | ax12 | IbbxIn (11) | bx12 | IBbxOn (11) |
| | ay12 | IbbxIp (11) | by12 | IBbxOp (11) | s01–s12 IB_Sh_Ret - high speed shield; multiple redundant contacts

Note that specification shown in Table 1 relating to InfiniBand™ connector contact assignments comports with the naming nomenclature of the InfiniBand™ specification. See "Table 56: Backplane Connector Board and Backplane Contact Assignments", InfiniBand™ Architecture Specification, Volume 2, Release 1.0.a, Chapter 10.3.3, p. 285.

Referring again to FIG. 5A, backplane 65 further includes dual fan trays 69 and dual power supplies 67 for redundancy purposes. As shown, dual fan trays 69 and dual power supplies 67 are operatively connected to I/O management units 230, which control all operations relating to fan trays 69 and power supplies 67.

As noted earlier, in accordance with one aspect of the present invention, shared I/O subsystem 60 can be used to implement new technology, such as an InfiniBand™ network system, over an existing network system such as an Ethernet without disrupting the operation of the existing infrastructure. Using shared I/O subsystem 60 shown in FIG. 5A, servers 255 having different operating systems (or servers 255 that follow different protocols) from one another can form a local area network within backplane 65. Within backplane 65, I/O management link 236 is interconnected to provide a point-to-point links between I/O interface units 62 and module management units 233, and between I/O management units 230 and switching units 235. That is, I/O management link 236 operatively interconnects each of the I/O interface units 62 to switch card 228. Thus, switch card 228 receives a data packet from one of I/O interface units 62 and directs the data packet to another one of I/O interface units 62 even if two I/O interface units 62 are coupled to two different computer systems that follow different protocols from one another. Using this configuration, shared I/O subsystem 60 uses, in accordance with one aspect of the present invention, an Internal Protocol to transfer a data packet that follows any one of various protocols between any I/O interface units 62. Internal Protocol is further described below.

In one embodiment of the present invention, I/O management link 236 includes an InfiniBand™ Maintenance Link (IBML) that follows the IBML protocol. See generally InfiniBand™ Architecture Specification, Volume 2, Release 1.0.a, Chapter 13. In this embodiment, shared I/O subsystem 60 uses IBML packets to transfer data over I/O management link 236 (or IBML). The IBML protocol is largely for simple register access to support various management functions, such as providing power control, checking backplane 65 status, etc.

In accordance with one aspect of the present invention, shared I/O subsystem 60 provides an Internal Protocol that supports the IBML protocol and other well-known protocols. Internal Protocol is a protocol used in shared I/O subsystem 60 to supports full duplex packet passing within I/O management link 236. Using Internal Protocol over I/O link layer 274 (shown in FIG. 5C), shared I/O subsystem 60 can support various protocols between each I/O interface unit 62 and between I/O interface units 62 and switch card 228. In one embodiment, Internal Protocol uses a data frame that is supported by IBML packets. More particularly, each IBML frame includes a user configurable portion that is used by the Internal Protocol to support various LAN-based protocols, such as TCP/IP, and in turn, support higher level protocols such as HyperText Transfer Protocol (HTTP), Simple Network Management Protocol (SNMP), Telnet, File Transfer Protocol (FTP), and others. In essence, Internal Protocol, in accordance with the present invention, can be viewed as IBML packets with user configured portions that support other protocols. See generally InfiniBand™ Architecture Specification, Volume 2, Release 1.0.a, Chapter 13.6.1 (discussing OEM-specific and/or vendor-specific commands). Note that use of the Internal Protocol over I/O management link 236 allows a system designer the ability to provide a web-based interface for configuring and/or monitoring shared I/O subsystem 60.

Figure 5C:
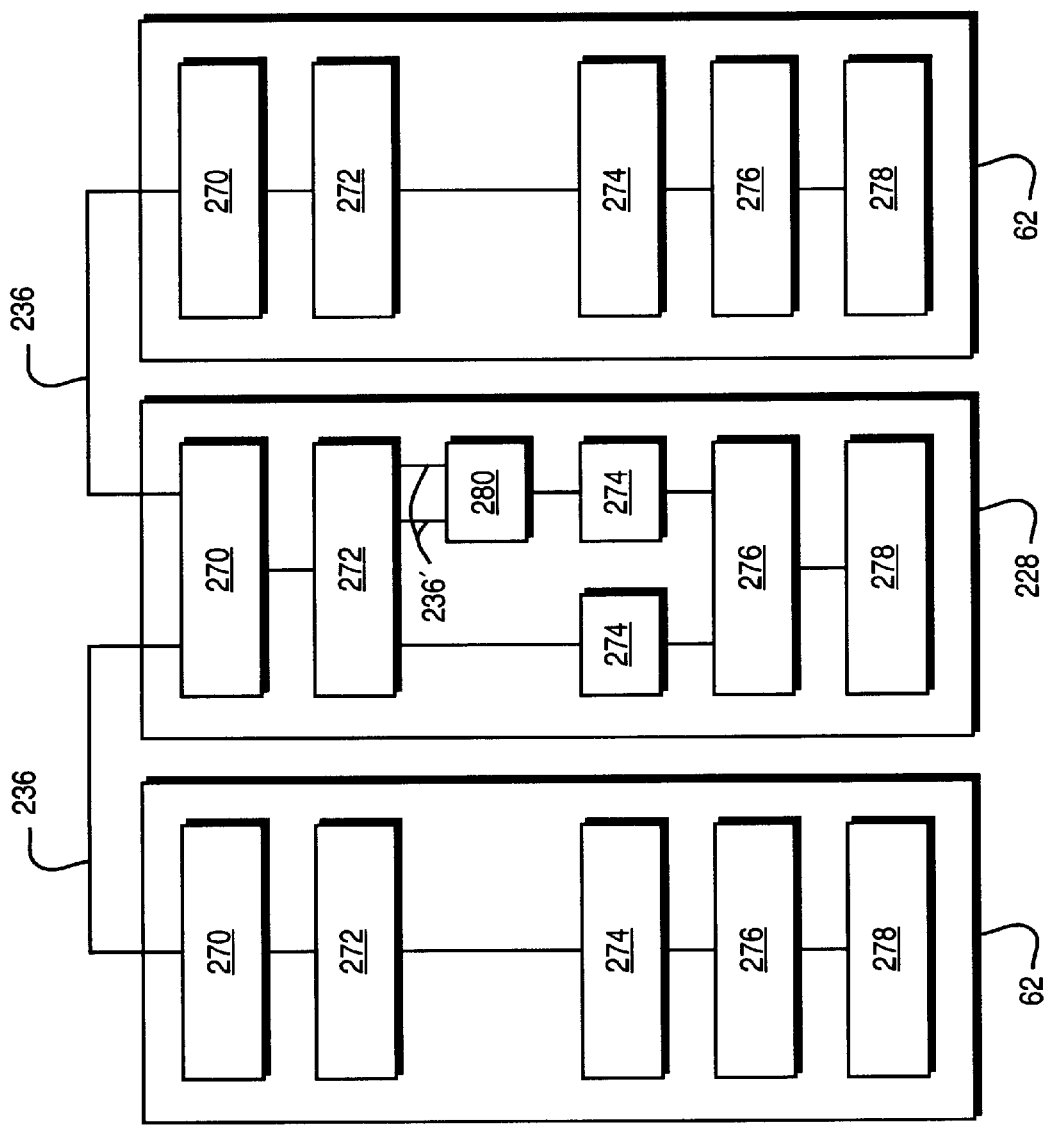
FIG. 5C is a block diagram showing a logical representation of various components in the shared I/O subsystem.

FIG. 5C shows a block diagram illustrating a logical representation of shared I/O subsystem 60 that uses Internal Protocol to provide a local area network for computer systems that are connected to I/O interface units 62. Here, each I/O interface unit 62 is essentially acting as a line card. Accordingly, in this embodiment, the terms I/O interface unit and line card could be used interchangeably. As shown, there are two I/O interface units 62 (or line cards), both of which are communicatively connected to switch card 228 via I/O management link 236. It should be noted that the embodiment shown in FIG. 5C uses the IBML link over I/O management link 236. However, other types of links can be used on I/O management link 236, and are within the scope of the present invention. It should also be noted that while the diagram shown in FIG. 5C depicts only two I/O interface units 62, other configurations using different number of I/O interface units 62 and switch card 228 can be configured and are within the scope of the present invention.

Various components of FIG. 5C are described herein. As shown, each I/O interface unit 62 includes controller 270. Controller 270 is a hardware component which provides a physical interface between I/O interface unit 62 and I/O management link 236. Controller 270 will be in the auxiliary power domain of I/O interface unit 62, and thus controller 270 can be used to power up I/O interface unit 62. Controller 270 is responsible for sending and receiving the IBML frames. Controller 270 performs little, if at all, interpretation of the IBML frames. Also, controller 270 will have no knowledge of the Internal Protocol.

Switch card 228 also includes controller 270. Controller 270 is a hardware component which implements multiple physical interfaces for switch card 228. In addition, controller 270 implements the functions provided by I/O management unit 230, module management unit 233 and switching unit 235. Controller 270 will also be responsible for sending and receiving the IBML frames. Controller 270 will perform little, if at all, interpretation of the IBML frames. Controller 270 will have no knowledge of the Internal Protocol. Note that all IBML traffic coming through controller 270 to driver 272 and link layer switch 280 will indicate which I/O management link 236 it came from or its destination.

Driver 272 is a software device driver on the main CPU (not shown) of I/O interface unit 62/switch card 230. Driver 272 interfaces with controller 270, and provides a multiplexing interface which allows multiple protocols to interface with driver 272. Link layer 274 or link layer switch 280 will be one such protocol. In addition, standard IBML applications (e.g., Baseboard Management, etc) will also interface with the single instance of driver 272. See generally InfiniBand™ Architecture Specification, Volume 2, Release 1.0.a. Driver 272 will allow standard IBML Baseboard Management packets to be interspersed with the Internal Protocol frames. Driver 272 will provide a simple alternating/round robin algorithm to intersperse outbound frames if frames of both types are queued to driver 272. Driver 272 will present inbound IBML data to the appropriate next layer. Driver 272 will be fully responsible for the physical interface between the main CPU (not shown) of I/O interface unit 62/switch card 230 and its IBML interface hardware. This interface may be a high speed serial port on a CPU or other interfaces.

In switch card 228, link layer switch 280 implements a switching function which logically has two I/O management links 236' as ports as well as having a port for switch card 228's own Internal Protocol stack. As in a typical switch, traffic would only be presented to switch card 228's link layer 274 if it was specifically addressed to switch card 228. The switching will only pertain to the Internal Protocol. Other inter-link IBML traffic will be handled via other means. Link layer switch 280 will be capable of reproducing broadcast messages. Link layer switch 280 will also direct unicast traffic only to the logical switch port which contains the destination address. Link layer switch 280 allows backplane 65 to function as a LAN with regard to the Internal Protocol.

Link layer 274 implements the Internal Protocol, and provides for fragmentation and reassembly of data frames. Link layer 274 expects in order delivery of packets and provides an unreliable datagram link layer. To the layers above it, an Ethernet API will be presented. Thus, standard Ethernet protocols, like ARP can be used without any modification. Link layer 274 is designed with the assumption that Internal Protocol frames arrive from a given source in order. In the event of frame/packet loss, the upper layer protocols perform retries.

As noted, using this configuration, standard network and transport protocols 276 which run over Ethernet can be run over the Internal Protocol. The various protocols that can be run over the Internal Protocol include TCP/IP, UDP/IP and even non-IP network protocols. Also, any application protocols 278, such as FTP, Telnet, SNMP, etc. can be run over the Internal Protocol.

Figure 6:
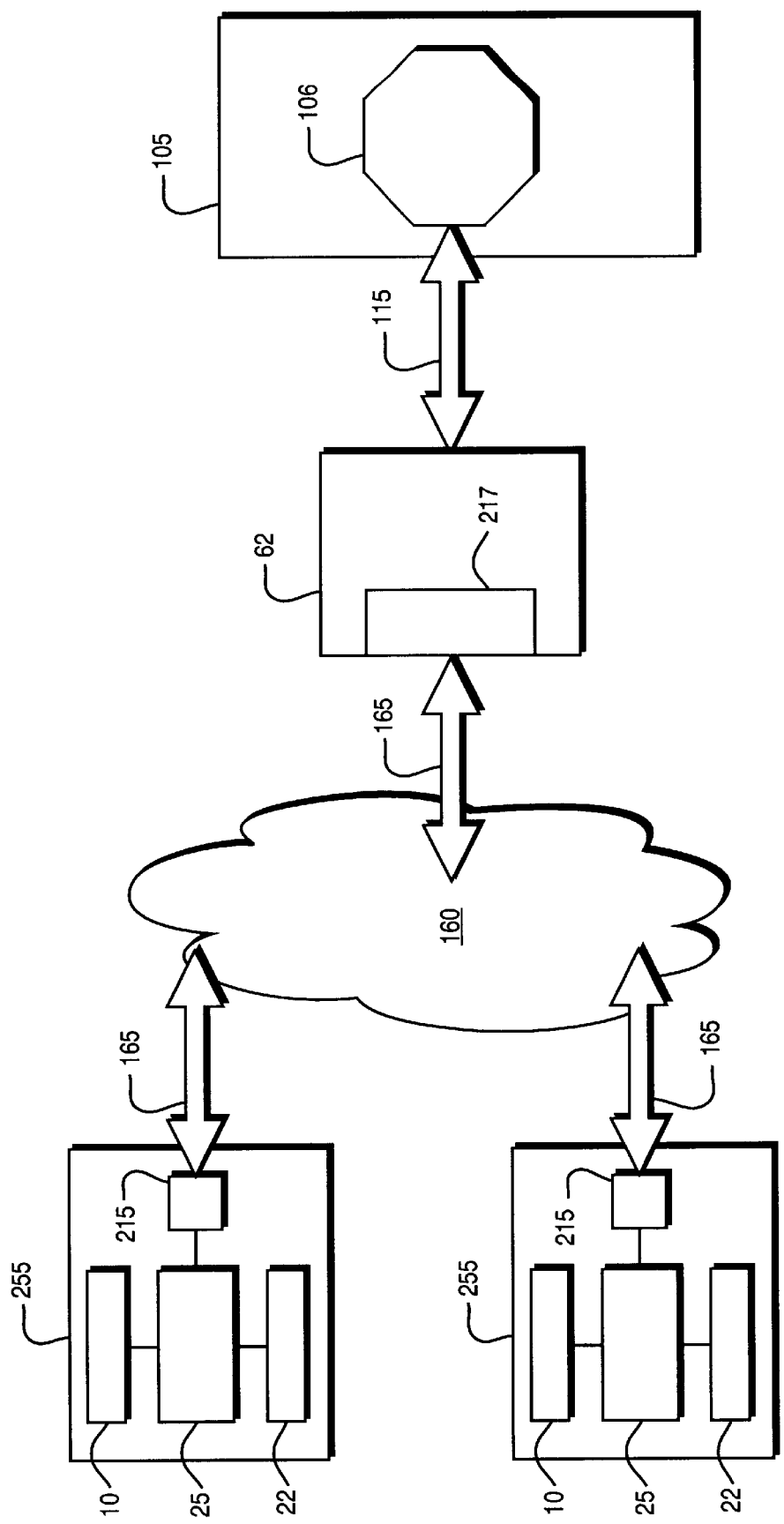
FIG. 6 is a block diagram of one embodiment showing the I/O interface unit coupled to multiple servers in accordance with the present invention.

FIG. 6 shows one embodiment of shared I/O subsystem 60 using I/O interface unit 62 coupled to multiple servers 255. The embodiment as shown has I/O interface unit 62 configured for use with InfiniBand protocols such as IBML protocol. On each server 255, HCA 215 performs all the functions required to send/receive complete I/O requests. HCA 215 communicates to I/O interface unit 62 by sending I/O requests through a fabric, such as InfiniBand fabric 160 shown in the diagram. As it is apparent from the diagram, typical network components such as NIC 40 and HBA 50 (shown in FIG. 1A) have been replaced with HCA 215.

In accordance with one aspect of the present invention, TCA 217 is coupled to I/O interface unit 62. TCA 217 communicates to HCA 215 through InfiniBand fabric 160. InfiniBand fabric 160 is coupled to both TCA 217 and HCA 215 through respective InfiniBand links 165. HCAs 215 and TCAs 217 enable servers 255 and I/O interface unit 62 to connect to InfiniBand fabric 160, respectively, over InfiniBand links 165. InfiniBand links 165 and InfiniBand fabric 160 provide for both message passing (i.e., Send/Receive) and memory access (i.e., Remote Direct Memory Access) semantics.

In essence, TCA 217 acts as a layer between servers 255 and I/O interface unit 62 for handling all data transfers and other I/O requests. I/O interface unit 62 connects to other network systems 105 such as Ethernet 110, FC SAN 120, IPC Network 130, or even the Internet 80 via Ethernet/FC link 115. Network systems 105 includes network systems device 106. Network systems device 106 can be any device that facilitates data transfers for networks such as a switch, router, or repeater.

Figure 7A:
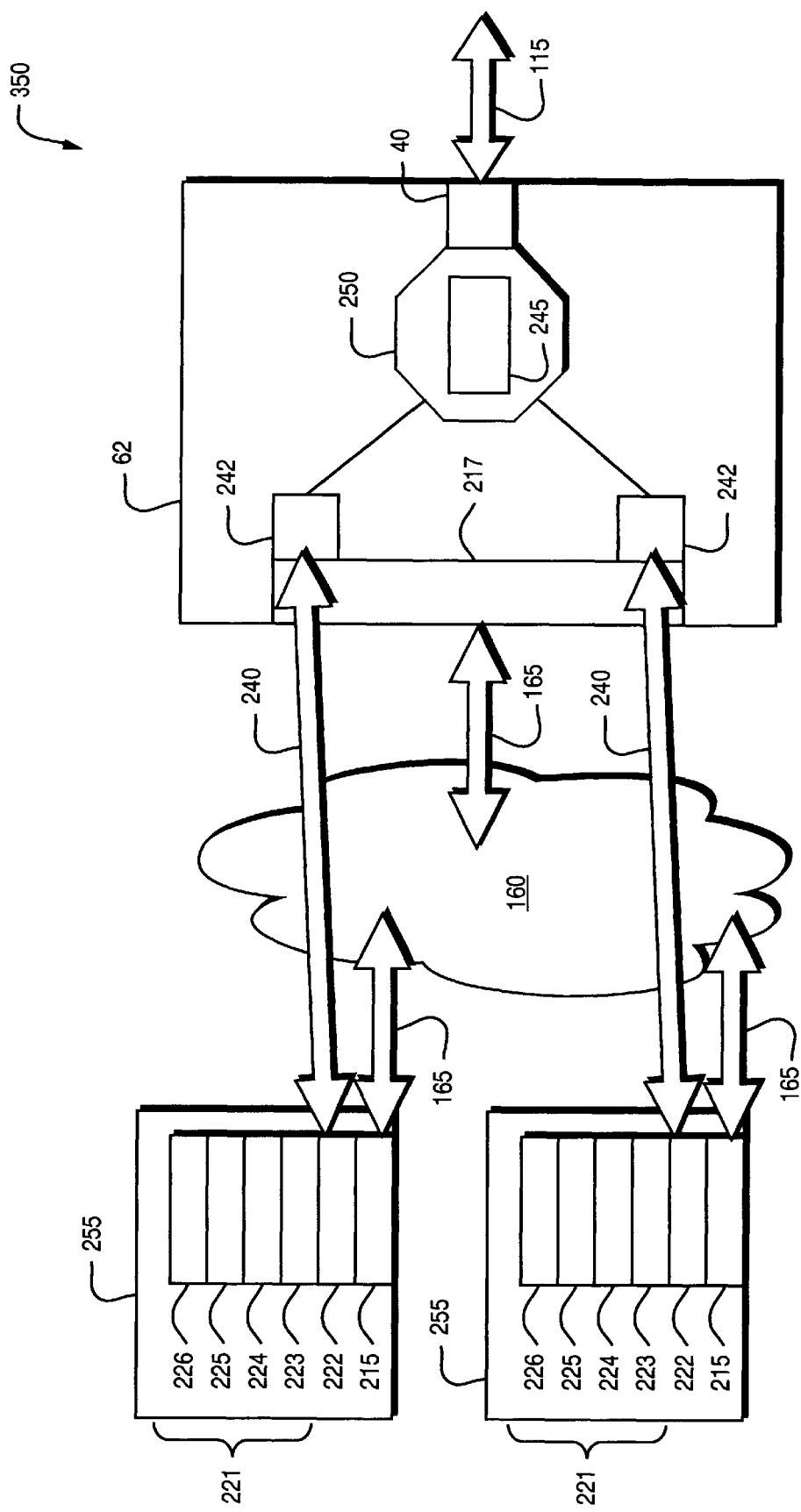
FIG. 7A illustrates one embodiment showing software architecture of network protocols for servers coupled to the I/O interface unit in accordance with the present invention.

FIG. 7A shows, in accordance with one aspect of the present invention, shared I/O interface unit configuration 350, illustrating software architecture of network protocols for servers coupled to one embodiment of I/O interface unit 62. As noted earlier and shown in FIGS. 1C, 2A, and 5, in accordance with one aspect of the present invention, one or more I/O interface units 62 may form a shared I/O subsystem 60. That is, each I/O interface unit 62 provides all functions provided by shared I/O subsystem 60. Connecting two or more I/O interface units 62 creates a larger unit, which is a shared I/O subsystem 60. In other words, each I/O interface unit 62 can be treated as a small shared I/O subsystem. Depending on a network configuration (either existing or new network configuration), I/O interface unit 62 can be configured to provide a connection to different types of network configurations such as FC SAN 120, Ethernet SAN 112, Ethernet LAN/WAN 114, or even InfiniBand Storage Network 265.

For instance, the embodiment of I/O interface unit 62 shown in FIG. 7A uses TCA 217 to communicate with servers 255. As shown, using TCA 217 and HCAs 215, I/O interface unit 62 and servers 255, respectively, communicate via InfiniBand fabric 160. InfiniBand fabric 160 is coupled to both TCA 217 and HCA 215 through respective InfiniBand links 165. There are multiple layers of protocol stacked on the top of HCA 215. Right above the HCA 215, virtual NIC 222 exists. In accordance with the present invention, as described further below, virtual NIC 222 is a protocol that appears logically as a physical NIC to a server 255. That is, virtual NIC 222 does not reside physically like NIC 40 does in a traditional server; rather virtual NIC 222 only appears to exist logically.

Using virtual NIC 222, server 255 communicates via virtual I/O bus 240, which connects to virtual port 242. Virtual port 242 exists within I/O interface unit 62 and cooperates with virtual NIC 222 to perform typical functions of physical NICs 40. Note that virtual NIC 222 effectively replaces the local PCI bus system 20 (shown in FIG. 1A), thereby reducing the complexity of a traditional server system. In accordance with one aspect of the present invention, a physical NIC 40 is "split" into multiple virtual NICs 222. That is, only one physical NIC 40 is placed in I/O interface unit 62. This physical NIC 40 is divided into multiple virtual NICs 222, thereby allowing all servers 255 to communicate with existing external networks via I/O interface unit 62. Single NIC 40 appears to multiple servers 255 as if each server 255 had its own NIC 40. In other words, each server "thinks" it has its own dedicated NIC 40 as a result of the virtual NMCs 222.

Switching function 250 provides a high speed movement of I/O packets and other operations between virtual ports 242 and NIC 40, which connects to Ethernet/FC links 115. As described in detail below, within switching function 250, forwarding table 245 exists, and is used to determine the location where each packet should be directed. Also within switching function 250, in accordance with one aspect of the present invention, a plurality of logical LAN switches (LLS) 253 (not shown) exists. Descriptions detailing the functionality of switching function 250, along with forwarding table 245, to facilitate processing I/O requests and other data transfers between servers 255 and existing (or new) network systems, using I/O interface unit 62, are illustrated in FIG. 8A.

In accordance with one aspect of the present invention, as shown further in FIG. 7A, all I/O requests and other data transfers are handled by HCA 215 and TCA 217. As noted above, within each server 255, there are multiple layers of protocol stacked on the top of HCA 215. As shown, virtual NIC 222 sits on top of HCA 215. On top of virtual NIC 222, a collection of protocol stack 221 exists. Protocol stack 221, as shown in FIG. 7A, includes link layer driver 223, network layer 224, transport layer 225, and applications 226.

Virtual NIC 222 exists on top of HCA 215. Link layer driver 223 controls the HCA 215 and causes data packets to traverse the physical link such as InfiniBand links 165. Above link layer driver 223, network layer 224 exists. Network layer 224 typically performs higher level network functions such as routing. For instance, in one embodiment of the present invention, the network layer 224 includes popular protocols such as Internet Protocol (IP) and Intemetwork Packet Exchange™ (IPX). Above network layer 224, transport layer 225 exists. Transport layer 225 performs even higher level functions, such as packet assembly/fragmentation, packet reordering, and recovery from lost or corrupted packets. In one embodiment of the present invention, the transport layer 225 includes Transport (or Transmission) Control Protocol (TCP).

Applications 226 exist above transport layer 225, and applications 226 make use of transport layer 225. In accordance with one aspect of the present invention, applications 226 include additional layers. For instance, applications 225 may include protocols like e-mail Simple Mail Transfer Protocol (SMTP), FTP and Web HTTP. It should be noted that there are many other applications that can be used in the present invention, which will be known to those skilled in the art.

An outbound packet (of data) originates in protocol stack 221 and is delivered to virtual NIC 222. Virtual NIC 222 encapsulates the packet into a combination of Send/Receive and Remote Direct Memory Access (RDMA) based operations which are delivered to HCA 215. These Send/Receive and RDMA based operations logically form virtual I/O bus 240 interface between virtual NIC 222 and virtual port 242. The operations (i.e., packet transfers) are communicated by HCA 215, through InfiniBand links 165 and InfiniBand fabric 160 to TCA 217. These operations are reassembled into a packet in virtual port 242. Virtual port 242 delivers the packet to switching function 250. Based on the destination address of the packet, forwarding table 245 is used to determine whether the packet will be delivered to another virtual port 242 or NIC 40, which is coupled to network systems 105.

Inbound packets originating in network systems 105 (shown in FIG. 6) arrive at I/O interface unit 62 via Ethernet/FC link 115. NIC 40 receives these packets and delivers them to switching function 250. Based on the destination address of the packets, forwarding table 245 is used to deliver the packets to the appropriate virtual port 242. Virtual port 242 performs a combination of Send/Receive and RDMA based operations, which are then delivered to TCA 217. Again, these Send/Receive and RDMA based operations logically form virtual I/O bus 240 interface between virtual port 242 and virtual NIC 222. The operations are then communicated from TCA 217 to HCA 215 via InfiniBand links 165 and InfiniBand fabric 165. These operations are reassembled into a packet in virtual NIC 222. Finally, virtual NIC 222 delivers the packet to protocol stack 221 accordingly.

Note that as part of both inbound and outbound packet processing by switching function 250 and forwarding table 245, the destination address (and/or source address) for a packet may be translated (also commonly referred to as Routing, VLAN insertion/removal, Network Address Translation, and/or LUN Mapping). In some cases, a packet (e.g., broadcast or multicast packet) may be delivered to more than one virtual port 242 and/or NIC 40. Finally, one or more addresses from selected sources may be dropped, and sent to no destination (which is commonly referred to as filtering, firewalling, zoning and/or LUN Masking). The detail process of switching function 250 is described further herein.

In accordance with one aspect of the present invention, a single NIC 40 (which can be an Ethernet aggregation conforming to standards such as IEEE 802.3ad or proprietary aggregation protocols such as Cisco®'s EtherChannel™) is connected to switching function 250. This feature provides a critical optimization in which forwarding table 245 can have a rather modest number of entries (e.g., on the order of 2–32 per virtual port 242). In addition, forwarding table 245 does not need to have any entries specific to Ethernet/FC link 115 connected to NIC 40. Furthermore, since virtual ports 242 communicate directly with a corresponding virtual NIC 222, there is no need for switching function 250 to analyze packets to dynamically manage the entries in forwarding table 245. This allows for higher performance at lower cost through reduced complexity in I/O interface unit 62.

In accordance with the present invention, shared I/O interface unit 62 or shared I/O subsystem 60 can be used in data transfer optimization. As noted earlier, one of the main drawbacks of the current bus system is that all I/Os on the bus are interrupt driven. Thus, when a sending device delivers data to the CPU, it would write the data to the memory over the bus system. When the device finishes writing the data, it sends an interrupt signal to the CPU, notifying that the write has been completed. It should be apparent that the constant CPU interruptions (e.g., via interrupt signals) by these devices decrease overall CPU performance. This is especially true on a dedicated server system. On the other hand, however, if no interrupt signal is used, there is a risk that the CPU may attempt to read the data even before the device finishes writing the data, thereby causing system errors. This is especially true if the device sends a variable length data packet such as an Ethernet packet.

Accordingly, in accordance with one aspect of the present invention, a novel method of sending/receiving a data packet having a variable length without using interrupt signals is described herein. One embodiment of the present invention uses virtual port frame 380 (shown in FIG. 7B) to exchange data between each virtual port 242 and between virtual port 242 and a physical I/O interface such as NIC 40, all of which are shown in FIG. 7A.

Figure 7B:
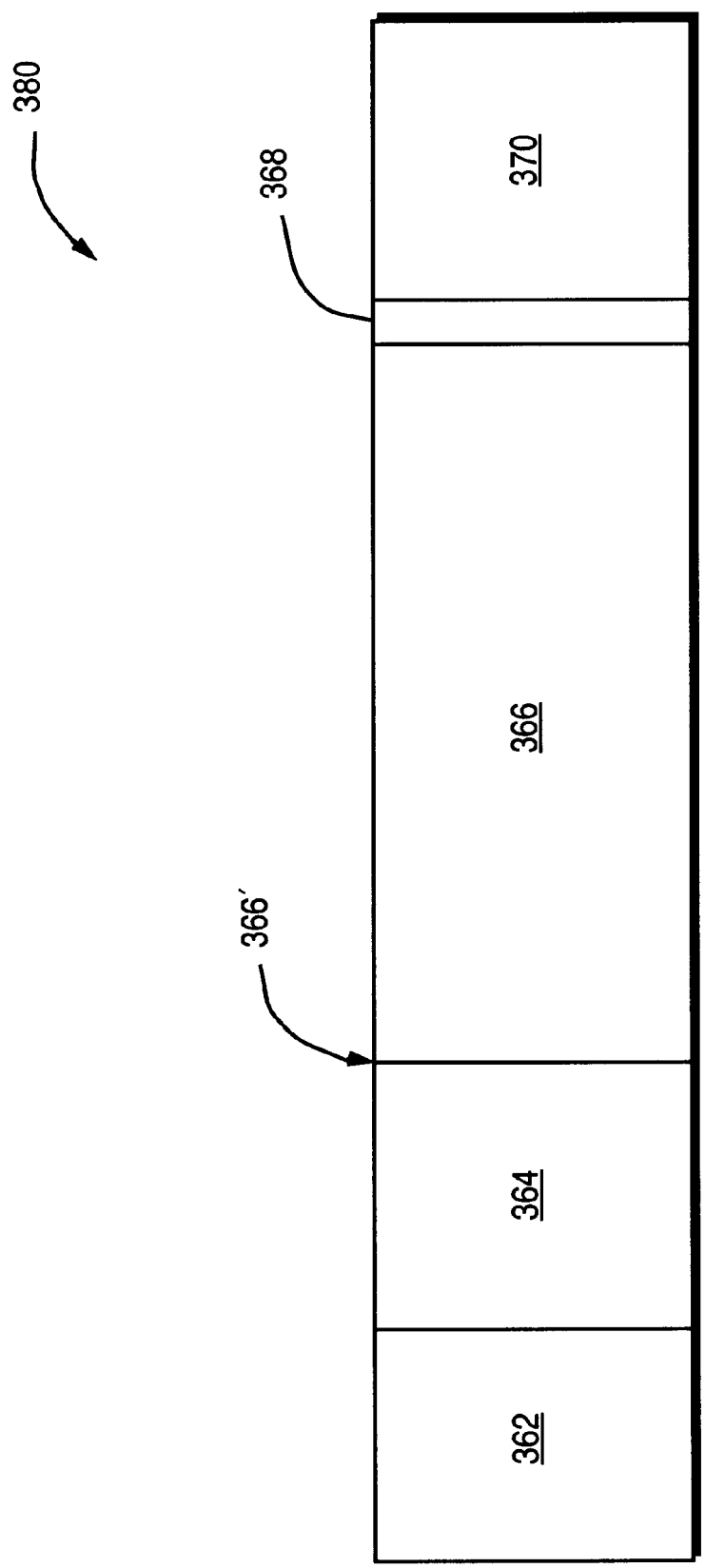
FIG. 7B shows a block diagram of a data frame in accordance with the present invention.

A virtual port 242 arranges (or writes) data into virtual port frame 380 (shown in FIG. 7B). Upon completion of write, virtual port frame 380 is transmitted to a buffer in shared I/O subsystem 60. Shared I/O subsystem 60, by detecting control bits contained in virtual port frame 380, recognizes when the transmission of data is completed. Thereafter, shared I/O subsystem 60 forwards the data packet to an appropriate virtual port 242.

The embodiment of using the Internal Protocol described above can be used to exchange data that follows many different protocols. For instance, virtual ports 242 can exchange virtual port frames 380 to communicate Ethernet frame data. That is, the virtual port frames 380 can be used to send/receive Ethernet data having a variable length among virtual ports 242 and NIC 40 without using interrupt signals.

FIG. 7B shows a block diagram depicting a logical structure of virtual port frame 380 that can be used to send Ethernet data having a variable length without using interrupt signals. More specifically, the diagram of FIG. 7B depicts how one virtual port 242 would arrange an Ethernet frame and control information into virtual port frame 380 prior to transmitting the data to a buffer in a shared I/O subsystem 60. In accordance with one aspect of the present invention, the variable data bits, such as an Ethernet frame, are arranged in first portion 366 followed by control bits in second portion 370. When a virtual port 242 arranges and transmits an virtual port frame 380 this way, shared I/O subsystem 60 knows when the transmission of data is finished by virtue of detecting control bits in second portion 370. Thus, there is no need to send an interrupt signal after sending the frame.

Various components of virtual port frame 380 shown in FIG. 7B are described herein. As noted, first portion 366 is used to arrange user data bits, such as an Ethernet frame, into virtual port frame 380. Note that the start of the Ethernet frame is always on a 4-byte boundary 366'. The size of the Ethernet frame is specified by the initiator (i.e., a virtual port 242 that arranges and transmit virtual port frame 380). Pad portion 368 has the maximum length of 31 bytes. The length of pad portion 368 is chosen to align the control bits, which are the last 32 bytes of virtual port frame 380, arranged in second portion 370. Pad portion 368 must have the correct length so that the address of the beginning of the Ethernet frame can be computed from the address of the control bits in second portion 370.

Second portion 370, as noted, contains the control bits. By detecting the control bits contained in second portion 370, shared I/O subsystem 60 knows the data transmission is completed. The size of control bits in second portion 370 is fixed. Second portion 370 containing control bits is constructed by the initiator. In one embodiment, the initiator writes the control bits in virtual port frame 380 by using a single RDMA Write.

In accordance with one aspect of the present invention, shared I/O subsystem 60 reserves address portion 362 to hold any packet header. Note that address portion 362 may need to be constructed. If so, address portion 362 is constructed during switching from one virtual port 242 to another virtual port 242. Also, note that the initiator avoids writing on control portion 364 by computing the RMDA address.

As noted earlier, after writing (or arranging) data into virtual port frame 380, the initiator (i.e., virtual port 242) transmits virtual port frame 380 to a buffer in shared I/O subsystem 60. Shared I/O subsystem 60 receives first portion 366 followed by second portion 370. Thereafter, shared I/O subsystem 60 verifies whether the data packet has been completely received by the buffer by monitoring a memory bit aligned with a final bit (the last bit in the control bits) in second portion 370 of virtual port frame 380. That is, the final bit is used to indicate whether the data transmitted is valid (or complete). Thus, by verifying the final bit of the control bits, it is possible to determine whether the entirety of data bits (i.e., Ethernet frame) has been received. Upon successful verification, the data packet is transmitted to an appropriate virtual port 242. It should be noted that since only one memory bit is required in the memory to verify each of virtual port frames 380, the data transmission is very efficient.

As noted, virtual port frame 380 can be used to transfer data that follows various protocols, and as such, using other data that follow different protocols (and variable length) is within the scope of the present invention.

FIG. 8A shows, in accordance with one aspect of the present invention, a logical diagram of I/O interface unit configuration 330, illustrating the process of data packet movement using one embodiment of I/O interface unit 62 that includes forwarding table 245, in accordance with one aspect of the present invention. In the embodiment of I/O interface unit 62 shown in FIG. 8A, there are three servers 255: host A, host B, and host C, all of which are operatively coupled to I/O interface unit 62 via virtual ports 242: virtual port X, virtual port Y, and virtual port Z, respectively. Note that I/O interface unit 62 includes one or more CPUs (not shown) for directing controls for protocols. In accordance with the present invention, I/O interface unit 62 is configured to operate as one or more LLSs 253. Thus, as shown in FIG. 8A, I/O interface unit 62 includes two LLSs 253: LLS 1 and LLS 2, both of which are operatively connected to Ethernet ports 260: E0 and E1, respectively. Note that, in accordance with one aspect of the present invention, every port (i.e., virtual ports 242 and Ethernet ports 260) has its own pair of hardware mask registers, namely a span pork mask register and local LLS register. The functionality of using mask registers is described further below.

As noted, forwarding table 245 is used to direct traffic for all LLSs 253 within I/O interface unit 62. As required for hardware performance, forwarding table 245 may be exactly replicated within I/O interface unit 62 such that independent hardware elements can avoid contention for a common structure. In accordance with one aspect of the present invention, for instance, a packet is processed as follows. After a packet is received, the destination address within forwarding table 245 is referenced. If the entry is not exactly found, the Default Unicast for unicast addresses or Default Multicast for multicast addresses is selected. The data bits of the selected entry are ANDed against the LLS mask register for the INPUT port on which the packet arrived. Also, the resulting data bits are ORed against the Span Port register for the INPUT port on which the packet arrived. Thereafter, the packet is sent out to all the ports that have the resulting bit value of 1. Table 2 below shows an exemplary forwarding table that can be used in shared I/O subsystem configuration 330 of FIG. 8A.

TABLE 2

| (1) Address | (2) Host Virtual Port: X | (3) Host Virtual Port: Y | (4) Host Virtual Port: Z | (5) Ethernet Port 0 | (6) Ethernet Port 1 | (7) Shared I/O Unit CPU |
|---|---|---|---|---|---|---|
| A | 1 | 0 | 0 | 0 | 0 | 0 |
| B | 0 | 1 | 0 | 0 | 0 | 0 |
| C | 0 | 0 | 1 | 0 | 0 | 0 |
| Multicast N | 1 | 0 | 0 | 1 | 0 | 0 |
| Multicast G | 1 | 1 | 1 | 1 | 1 | 0 |
| Multicast 802.3ad | 0 | 0 | 0 | 1 | 1 | 1 |
| Broadcast | 1 | 1 | 1 | 1 | 1 | 1 |
| Default Unicast | 0 | 0 | 0 | 1 | 1 | 0 |
| Default Multicast | 0 | 0 | 0 | 1 | 1 | 0 |

As shown in Table 2, column 1 corresponds to destination address information (48 bit Media Access Control (MAC) address and 12 bit VLAN tag) for each I/O request. Columns 2, 3, and 4 represent host virtual ports 242 for host X, host Y, and host Z, respectively. As shown, there is 1 bit per host virtual port 242. Columns 5 and 6 include 1 bit per each Ethernet port 1 and Ethernet port 2, respectively. Column 7 includes 1 bit for shared I/O unit CPU.

Table 2 reflects a simple ownership of Unicast addresses for each host (A, B, C). In addition, host A (port X) may access multicast address N. All hosts may access multicast address G and the broadcast address. Shared I/O unit CPU will process 802.3ad packets destined to the well known 802.3ad multicast address. For this configuration the port specific registers could appear as follows in Table 3.

TABLE 3

| (1) Register | (2) Host Virtual Port: X | (3) Host Virtual Port: Y | (4) Host Virtual Port: Z | (5) Ethernet Port 0 | (6) Ethernet Port 1 | (7) Shared I/O Unit CPU |
|---|---|---|---|---|---|---|
| X LLS Mask | 0 | 1 | 0 | 1 | 0 | 1 |
| Y LLS Mask | 1 | 0 | 0 | 1 | 0 | 1 |
| Z LLS Mask | 0 | 0 | 0 | 0 | 1 | 1 |
| E0 LLS Mask | 1 | 1 | 0 | 0 | 0 | 1 |
| E1 LLS Mask | 0 | 0 | 1 | 0 | 0 | 1 |
| X Span Port | 0 | 0 | 0 | 0 | 0 | 0 |
| Y Span Port | 0 | 0 | 0 | 0 | 0 | 0 |
| Z Span Port | 0 | 0 | 0 | 0 | 0 | 0 |
| E0 Span Port | 0 | 0 | 0 | 0 | 0 | 0 |
| E1 Span Port | 0 | 0 | 0 | 0 | 0 | 0 |

Note that in Table 3, only ports within the same LLS 253 have a value 1. It should also be noted that the shared I/O unit CPU is in all LLSs 253 so the shared I/O unit CPU can perform all requisite control functions. The bit corresponding to the port is always 0 within the LLS mask for that port.

This ensures that traffic is never sent out to the port it arrived on. Also, the Span Port registers are all 0s, reflecting that no Span Port is configured. There is no LLS mask or Span Port register for the shared I/O unit CPU. To conserve hardware, the shared I/O unit CPU will provide the appropriate value for these masks on a per packet basis. This is necessary since the shared I/O unit CPU can participate as a management entity on all the LLSs 253 within shared I/O unit.

Figure 8B:
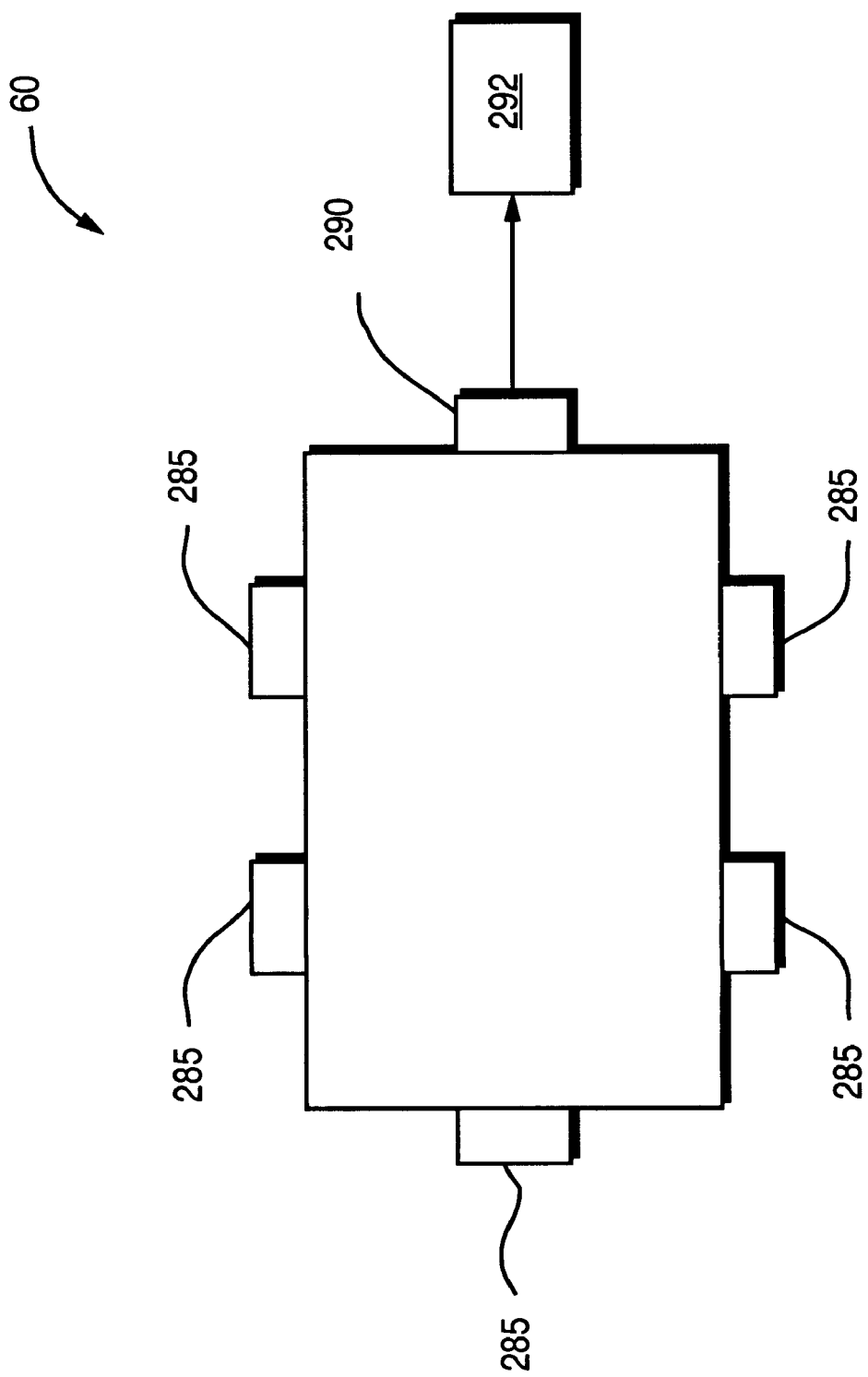
FIG. 8B is a logical diagram of one embodiment of shared I/O subsystem having a span port, in accordance with the present invention.

In accordance with one aspect of the present invention, a span port register is configurable. That is, data packets arriving on each of the ports are selectively provided to a span port based on a current state of the adjustable span port register. FIG. 8B shows a logical diagram of one embodiment of shared I/O subsystem 60 having a span port. As shown, there are several source ports 285, each of which operatively connects to a computer system such as a server or network. Any of these source ports 285 can be monitored by a device, such as a LAN analyzer 292, through span port 290. By varying the configuration of the span port register, the source ports 285 monitored by the span port 290 can be varied.

The following example illustrates the process outlined above. Assume that a packet arrives on E0 destined for MAC A. The packet is processed as follows.

| Forwarding Table Entry: | 100000 |
|---|---|
| AND E0 LLS Mask: | 110001 |
| OR E0 Span Port: | 000000 |
| Result: | 100000 |

As noted earlier, when a packet is received, the destination address within forwarding table 245 is referenced. In the above example, since the packet was destined for MAC A, its forwarding table entry equals 100000 (i.e., Row A from Table 2). Thus, the packet is sent out to virtual port X (to Host A).

Now, assume that a packet arrives on E0 destined for MAC C. The packet is processed as follows.

| Forwarding Table Entry: | 001000 |
|---|---|
| AND E0 LLS Mask: | 110001 |
| OR E0 Span Port: | 000000 |
| Result: | 000000 |

Thus, the packet is discarded.

Further assume that a packet arrives on E0 destined for Multicast MAC G. The packet is processed as follows.

| Forwarding Table Entry: | 111110 |
|---|---|
| AND E0 LLS Mask: | 110001 |
| OR E0 Span Port: | 000000 |
| Result: | 110000 |

Thus, the packet is sent out to virtual ports X and Y (to Hosts A and B, respectively).

Further assume that a packet arrives on E1 destined for Multicast MAC G. The packet is processed as follows.

| Forwarding Table Entry: | 111110 |
|---|---|
| AND E1 LLS Mask: | 001001 |

-continued

| OR E1 Span Port: | 000000 |
|---|---|
| Result: | 001000 |

Thus, the packet is sent out to virtual port Z (to Host C).

Further assume that a packet arrives on E0 destined for 802.3ad multicast address. The packet is processed as follows.

| Forwarding Table Entry: | 000111 |
|---|---|
| AND E0 LLS Mask: | 110001 |
| OR E0 Span Port: | 000000 |
| Result: | 000001 |

Thus, the packet is sent to the shared I/O unit CPU.

Further assume that a packet arrives on virtual port X, destined to Unicast K (not shown in above tables). It will be processed as follows.

| Forwarding Table Entry: | 000110 | (default unicast) |
|---|---|---|
| AND X LLS Mask: | 010101 | |
| OR X Span Port: | 000000 | |
| Result: | 000100 | |

Thus, the packet is sent out to E0.

From the above example, it should be noted that the Span port registers allow very flexible configuration of the Span Port. For instance, setting E0 Span Port to 100000, will cause all input on E0 to be sent to virtual port X, which allows host A to run a LAN analyzer 292 for external Ethernet traffic. Also, setting Y Span Port to 1000000 (possibly in conjunction with E0 Span port) will cause all traffic in LLS 1 to be sent to virtual port X. This approach allows the Span port to select input ports from which it would like to receive traffic. Setting the X Span Port to 000100 would allow all traffic from port X to be visible on E0, thereby allowing monitoring by an external LAN Analyzer 292.

Note that having separate Span Port registers (as opposed to just setting a column to 1 in forwarding table 245), provides several advantages. For instance, the Span port can be quickly turned off, without needing to modify every entry in forwarding table 245. Also, the Span port can be controlled such that it observes traffic based on which input port it arrived on, providing tighter control over debugging. Further note that the Span Port register is ORed after the LLS mask register. This allows debug information to cross LLS boundaries.

As noted, the VLAN portion of the Address is a 12 bit field. Having value 0 indicates that VLAN information is ignored (if present). The MAC address field is the only comparison necessary. Also, having a value from 1 through 4095 indicates that the VLAN tag must be present and exactly match. When a host has limited its interest to a single VLAN tag (or set of VLAN tags), no packets without VLAN tags (or with other VLAN tags) should be routed to that host. In this case, entries in forwarding table 245 need to be created to reflect the explicit VLAN tags.

Returning to the previous example, assume that host A is interested in VLAN tags 2 and 3 and host B is interested in VLAN tag 4. Host C does not use VLAN information. VLAN information is reflected in Table 4 below in the address field.

TABLE 4

| (1) Addr MAC/VLAN | (2) Host Virtual Port: X | (3) Host Virtual Port: Y | (4) Host Virtual Port: Z | (5) Ethernet Port 0 | (6) Ethernet Port 1 | (7) Shared I/O Unit CPU |
|---|---|---|---|---|---|---|
| A/2 | 1 | 0 | 0 | 0 | 0 | 0 |
| A/3 | 1 | 0 | 0 | 0 | 0 | 0 |
| B/4 | 0 | 1 | 0 | 0 | 0 | 0 |
| C/0 | 0 | 0 | 1 | 0 | 0 | 0 |
| Multicast N/2 | 1 | 0 | 0 | 1 | 0 | 0 |
| Multicast N/3 | 1 | 0 | 0 | 1 | 0 | 0 |
| Multicast G/2 | 1 | 0 | 1 | 1 | 1 | 0 |
| Multicast G/4 | 0 | 1 | 1 | 1 | 1 | 0 |
| Multicast G/0 | 0 | 0 | 1 | 0 | 1 | 0 |
| Multicast 802.3ad | 0 | 0 | 0 | 1 | 1 | 1 |
| Broadcast/2 | 1 | 0 | 1 | 1 | 1 | 1 |
| Broadcast/3 | 1 | 0 | 1 | 1 | 1 | 1 |
| Broadcast/4 | 0 | 1 | 1 | 1 | 1 | 1 |
| Broadcast/0 | 0 | 0 | 1 | 1 | 1 | 1 |
| Default Unicast | 0 | 0 | 0 | 1 | 1 | 0 |
| Default Multicast | 0 | 0 | 0 | 1 | 1 | 0 |

As shown in Table 4 above, if a packet is received for Multicast G/2, there are two table entries it can match (G/2 or G/0). When more than one entry matches, the more specific entry (G/2) is be used. There is no requirement for a host to be interested on each address on every VLAN, in the above example, note that host A is interested in G/2, but not G/3. The Default Unicast and Default Multicast entries do not have is for any of virtual ports 242. Thus, Default Unicast and Default Multicast entries will not cause inbound traffic to be mistakenly delivered to a host in the wrong VLAN. It should be noted that host C, while it has not expressed VLAN interest in the table, could still be filtering VLANs purely in software on the host. The example shows host A using a single virtual port for VLAN 2 and 3. It would be equally valid for host A to establish a separate virtual port for each VLAN, in which case the table would direct the appropriate traffic to each virtual port 242.

It should be apparent based on the foregoing description that forwarding table 245 is unlike the common forwarding tables that exist in a typical network system device 106 such as switches or routers, which are found in typical network systems 105. Rather than containing entries learned or configured specific to each Ethernet/FC link 115, forwarding table 245 contains only entries specific to virtual NICs 222 and their corresponding virtual ports 242. These entries are populated using the same mechanism any NIC 40 would use to populate a filter located in NIC 40. In this regard, forwarding table 245 functions as a combined filter table for all virtual NICs 222. Furthermore, since forwarding table 245 exists in I/O interface unit 62, there is no need for virtual NICs 222 to implement a filter table. As a result, complexity within server 255 is dramatically reduced. Note that in another aspect of the present invention, I/O interface unit 62 could provide the same functionality to FC SAN 120. In that embodiment, a packet could be an actual I/O Request (e.g., a disk Read or Write command) which represents a sequence of transfers on network systems 105. Thus, the present invention allows multiple servers 255 to share a single NIC 40 with greatly reduced complexity both within server 255 and I/O interface unit 62.

Figure 9:
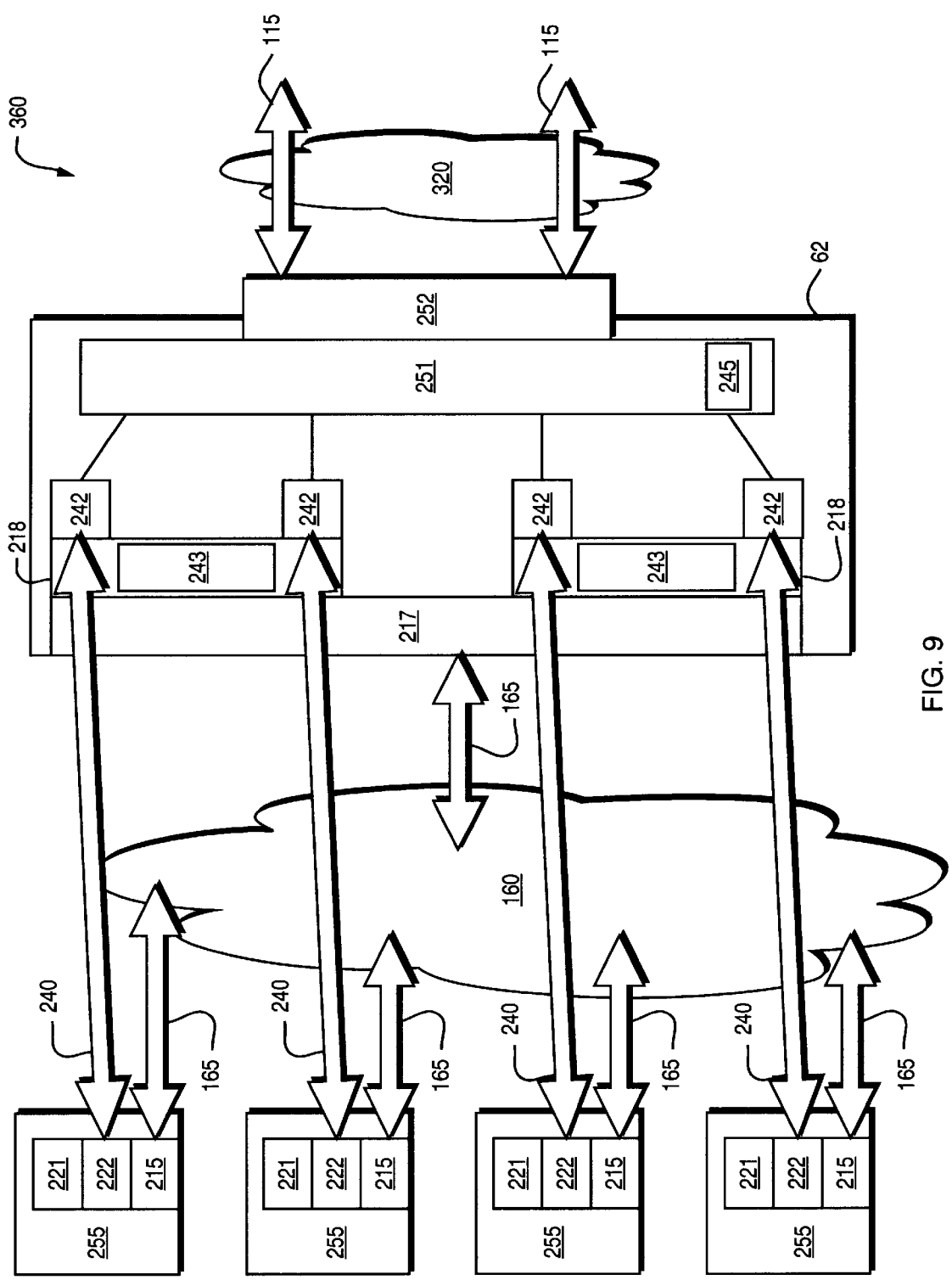
FIG. 9 illustrates yet another embodiment showing software architecture of network protocols for servers coupled to the I/O interface unit in accordance with the present invention.

FIG. 9 shows, in accordance with another aspect of the present invention, another embodiment of shared I/O unit configuration 360, illustrating software architecture of network protocols for servers coupled to I/O interface unit 62.

As shown, the embodiment of I/O interface unit 62 in this configuration 360 includes one or more virtual I/O controllers 218. Each virtual NIC 222 located in servers 255 connects to a specific virtual I/O controller 218 within I/O interface unit 62. Virtual I/O bus 240 is between virtual NIC 222 and virtual port 242. In order to insure that a given virtual NIC 222 is always given the same MAC Address within network systems 105, an address cache 243 is maintained in the I/O controller 218. Each server has its own unique MAC address. Ethernet is a protocol that works at the MAC layer level.

In accordance with the present invention, virtual I/O controller 218 is shareable. This feature enables several virtual NICs 222, located in different servers, to simultaneously establish connections with a given virtual I/O controller 218. Note that each I/O controller 218 is associated with a corresponding Ethernet/FC link 115. Aggregatable switching function 251 provides for high speed movement of I/O packets and operations between multiple virtual ports 242 and aggregation function 252, which connects to Ethernet/FC links 115. Within aggregatable switching function 251, forwarding table 245 is used to determine the location where each packet should be directed. Aggregation function 252 is responsible for presenting Ethernet/FC links 115 to the aggregatable switching function as a single aggregated link 320.

In accordance with one aspect of the present invention, all I/O requests and other data transfers are handled by HCA 215 and TCA 217. Within each server 255, there are multiple layers of protocol stacked on the top of HCA 215. Virtual NIC 222 sits on top of HCA 215. On top of virtual NIC 222, a collection of protocol stack 221 exists. Protocol stack 221 includes link layer driver 223, network layer 224, transport layer 225, and applications protocol 226, all of which are not shown in FIG. 9 for the purposes of brevity and clarity.

An outbound packet originates in protocol stack 221 and is delivered to virtual NIC 222. Virtual NIC 222 then transfers the packet via virtual I/O bus 240 to virtual port 242. The virtual I/O bus operations are communicated from HCA 215 to TCA 217 via InfiniBand link 165 and InfiniBand fabric 160. Virtual port 242 delivers the packet to aggregatable switching function 251. As noted above, based on the destination address of the packet, forwarding table 245 is used to determine whether the packet will be delivered to another virtual port 242 or aggregation function 252. For packets delivered to aggregation function 252, aggregation function 252 selects the appropriate Ethernet/FC link 115, which will be used to send the packet network systems 105.

Inbound packets originating in network systems 105 arrive at I/O interface unit 62 via Ethernet/FC link 115. Aggregation function 252 receives these packets and delivers them to the aggregatable switching function 251. As noted above, based on the destination address of the packet, forwarding table 245 delivers the packet to the appropriate virtual port 242. Virtual port 242 then transfers the packet over virtual I/O bus 240 to the corresponding virtual NIC 222. Note that virtual I/O bus 240 operations are communicated from TCA 217 to HCA 215 via InfiniBand link 165 and InfiniBand fabric 160. Virtual NIC 222 then delivers the packet to protocol stack 221 located in server 255.

When Ethernet/FC links 115 are aggregated into a single aggregated logical link 320, aggregatable switching function 251 treats forwarding table 245 as one large table. The destination address for any packet arriving from aggregation function 252 is referenced in forwarding table 245 and the packet is delivered to the appropriate virtual port(s) 242.

Similarly, the destination address for any packet arriving from virtual NIC 222 and virtual port 242 to aggregatable switching function 251 is referenced in forwarding table 245. If the packet is destined for network systems 105, it is delivered to aggregation function 252. Aggregation function 252 selects the appropriate Ethernet/FC link 115, that can be used to send the packet out to network systems 105.

When Ethernet/FC links 115 are not aggregated, aggregatable switching function 251 treats forwarding table 245 as two smaller tables. The destination address for any packet arriving from aggregation function 252 is referenced in forwarding table 245 corresponding to the appropriate Ethernet/FC link 115 from which the packet arrived. The packet will then be delivered to appropriate virtual port 242, but only those virtual ports 242 associated with I/O controller 218 corresponding to the Ethernet/FC link 115, in which the packet arrived on, is considered for delivery of the packet. Similarly, the destination address for any packet arriving from virtual NIC 222 and virtual port 242 to aggregatable switching function 251 is referenced in forwarding table 245. If the packet is destined for network systems 105, it is delivered to aggregation function 252. In this situation; aggregation function 252 always selects Ethernet/FC link 115 corresponding to I/O controller 218 associated with virtual port 242, in which the packet arrived on.

Since the only difference in operation between aggregated and non-aggregated links is the behavior of the aggregatable switching function 251 and aggregation function 252, there is never a need for configuration changes in virtual NIC 222 nor server 255 when aggregations are established or broken. Also, since the packets to/from a single virtual NIC 222 are carefully controlled with regard to which Ethernet/FC link 115 they will be sent out on and received from, there is no confusion in network systems 105 regarding the appropriate, unambiguous, path to a given virtual NIC 222.

While much of the description herein regarding the systems and methods of the present invention pertains to the network systems of large enterprises, the systems and methods, in accordance with the present invention, are equally applicable to any computer network system.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. In a shared I/O subsystem having a plurality of ports, each of the ports having a plurality of address bits and first and second masks associated therewith, a method comprising:
    (a) receiving a data packet from a first of the plurality of ports;
    (b) selecting from one or more tables the plurality of address bits and the first and second masks associated with the first port;
    (c) applying an AND function to the address bits and the first mask associated with the first port;
    (d) applying an OR function to the result of step (c) and the second mask associated with the first port; and
    (e) selectively transmitting the data packet to one or more of the ports in accordance with a result of step (d).

2. The method of claim 1, wherein the first mask associated with each of the ports corresponds to a logical LAN switch mask, and the second mask associated with each of the ports corresponds to a span port mask.

3. The method of claim 1, wherein at least one of the ports is a virtual port.

4. The method of claim 1, wherein at least one of the ports is an I/O interface.

5. The method of a claim 4, wherein the I/O interface is communicatively coupled to at least one of a network, an appliance, and a device.

6. The method of claim 5, wherein the network is a Storage Area Network.

7. The method of claim 5, wherein the network is an InterProcess Communications Network.

8. The method of claim 5, wherein the network is a Local Area Network.

9. The method of claim 5, wherein the network is a Wide Area Network.

10. The method of claim 5, wherein the network is a Metropolitan Area Network.

11. The method of claim 5, wherein the network is a System Area Network.

12. The method of claim 4, wherein the I/O interface is operatively coupled to a network unit including at least one of a switch, a hub, a router, and a bridge.

13. The method of claim 1, wherein at least one of the ports is an Ethernet Media Access Control (MAC) port.

14. The method of claim 1, wherein the address bits include at least one of MAC address bits and VLAN address bits.

15. The method of claim 1, wherein the data packet is one from the group of: a Multicast, a Unicast, and a Broadcast.

16. The method of claim 1, wherein at least one of the ports is communicatively coupled to a computer system having one or more MAC addresses.

17. The method of claim 1, wherein the ports are communicatively coupled to a plurality of computer systems, and wherein one of the computer systems uses an operating system that is different from an operating system used by one other of the computer systems.

18. The method of claim 1, wherein the data packet conforms to a protocol that uses at least one of a Send/Receive message passing and a Remote Direct Memory Access (RDMA).

19. The method of claim 1, wherein the data packet is filtered in the shared I/O subsystem.

20. A shared I/O subsystem comprising:
    a plurality of ports, each of the ports having a plurality of address bits and first and second masks associated therewith; and
    one or more tables;
    wherein the shared I/O subsystem receives a data packet from a first of the plurality of ports, selects from one or more tables the plurality of address bits and the first and second masks associated with the first port, applies an AND function to the address bits and the first mask associated with the first port, applies an OR function to the result of applying the AND function and the second mask associated with the first port, and selectively transmits the data packet to one or more of the ports in accordance with a result of applying the OR function.

21. A shared I/O subsystem having a plurality of ports, each of the ports having a plurality of address bits and first and second masks associated therewith, comprising:
    means for receiving a data packet from a first of the plurality of ports;
    means for selecting from one or more tables the plurality of address bits and the first and second masks associated with the first port;

means for applying an AND function to the address bits and the first mask associated with the first port;

means for applying an OR function to the result of applying the AND function and the second mask associated with the first port; and means for selectively transmitting the data packet to one or more of the ports in accordance with a result of applying the OR function.

* * * * *